(12) United States Patent
Lee et al.

(10) Patent No.: US 10,957,315 B2
(45) Date of Patent: Mar. 23, 2021

(54) MOBILE TERMINAL AND METHOD FOR CONTROLLING MOBILE TERMINAL USING MACHINE LEARNING

(71) Applicant: LG ELECTRONICS INC., Seoul (KR)

(72) Inventors: Jungho Lee, Seoul (KR); Guntae Bae, Seoul (KR); Junkwan Lee, Seoul (KR); Jongwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 15/934,558

(22) Filed: Mar. 23, 2018

(65) Prior Publication Data

US 2019/0051298 A1 Feb. 14, 2019

(30) Foreign Application Priority Data

Aug. 11, 2017 (KR) .......................... 10-2017-0102549

(51) Int. Cl.
| | |
|---|---|
| *G10L 15/22* | (2006.01) |
| *H04M 1/725* | (2006.01) |
| *G06F 3/16* | (2006.01) |
| *G10L 15/08* | (2006.01) |
| *H04M 1/27* | (2006.01) |

(52) U.S. Cl.
CPC .............. *G10L 15/22* (2013.01); *G06F 3/167* (2013.01); *H04M 1/72522* (2013.01); *G10L 2015/088* (2013.01); *G10L 2015/223* (2013.01); *G10L 2015/225* (2013.01); *H04M 1/271* (2013.01); *H04M 2250/74* (2013.01)

(58) Field of Classification Search
CPC .............. G10L 15/22; G10L 2015/088; G10L 2015/225; G06F 3/167; H04M 1/72522; H04M 1/271; H04M 2250/74
USPC ......................................................... 704/270
See application file for complete search history.

(56) References Cited

U.S. PATENT DOCUMENTS

| | | | |
|---|---|---|---|
| 6,021,428 A * | 2/2000 | Miloslavsky | ....... G06F 11/1008 348/E7.082 |
| 7,769,591 B2 * | 8/2010 | White | ..................... G10L 15/30 704/255 |
| 8,352,277 B2 * | 1/2013 | Bennett | ................. G06F 40/289 704/270.1 |

(Continued)

OTHER PUBLICATIONS

PCT International Application No. PCT/KR2018/007638, Notification of Transmittal of the International Search Report and the Written Opinion of the International Searching Authority, or Declaration dated Oct. 18, 2018, 13 pages.

*Primary Examiner* — Mohammad K Islam
(74) *Attorney, Agent, or Firm* — Lee, Hong, Degerman, Kang & Waimey PC

(57) ABSTRACT

Provided are a mobile terminal including an artificial intelligent agent and a method for controlling a mobile terminal using machine learning. A mobile terminal comprises a microphone, a learning data unit configured to identify and store keywords and a controller configured to: activate the microphone in response to an activation event, receive a voice input via the microphone, extract vocabulary information from the received voice input and execute a control corresponding to command information included in the received voice input, wherein the executed control is varied by utilizing the keywords and the extracted vocabulary information.

16 Claims, 17 Drawing Sheets

(56) References Cited

U.S. PATENT DOCUMENTS

| | | | |
|---|---|---|---|
| 8,504,370 B2 * | 8/2013 | Hong | G10L 15/22 |
| | | | 704/200 |
| 8,942,984 B2 * | 1/2015 | Kim | G10L 15/22 |
| | | | 704/270 |
| 9,575,963 B2 * | 2/2017 | Pasupalak | G06F 40/20 |
| 10,013,986 B1 * | 7/2018 | Bhaya | G06F 3/167 |
| 10,038,938 B1 * | 7/2018 | Roe | H04N 21/4532 |
| 10,241,553 B2 * | 3/2019 | Heo | G06F 1/1694 |
| 10,379,808 B1 * | 8/2019 | Angel | G06F 3/167 |
| 10,387,410 B2 * | 8/2019 | Suleman | G06F 3/16 |
| 10,476,872 B2 * | 11/2019 | McLaren | G10L 15/22 |
| 10,489,111 B2 * | 11/2019 | Jeong | G06F 3/167 |
| 10,614,153 B2 * | 4/2020 | Rimmer | G06F 40/103 |
| 2006/0240856 A1 * | 10/2006 | Counts | H04W 4/08 |
| | | | 455/518 |
| 2007/0249406 A1 | 10/2007 | Andreasson | |
| 2009/0164926 A1 * | 6/2009 | Boyle | G06F 16/24575 |
| | | | 715/764 |
| 2012/0035931 A1 * | 2/2012 | LeBeau | H04M 1/72522 |
| | | | 704/251 |
| 2013/0110518 A1 * | 5/2013 | Gruber | H04M 1/72563 |
| | | | 704/275 |
| 2013/0159003 A1 | 6/2013 | Kim et al. | |
| 2013/0179173 A1 | 7/2013 | Lee et al. | |
| 2014/0188485 A1 * | 7/2014 | Kim | H04L 12/282 |
| | | | 704/275 |
| 2014/0274211 A1 | 9/2014 | Sejnoha et al. | |
| 2014/0337048 A1 * | 11/2014 | Brown | G06F 3/04886 |
| | | | 705/2 |
| 2016/0269524 A1 * | 9/2016 | Stottlemyer | H04B 1/3822 |
| 2016/0372110 A1 | 12/2016 | Waltermann et al. | |
| 2017/0116986 A1 * | 4/2017 | Weng | G10L 15/22 |
| 2017/0345422 A1 * | 11/2017 | Yang | G10L 15/22 |
| 2017/0372703 A1 * | 12/2017 | Sung | G10L 15/30 |
| 2018/0047386 A1 * | 2/2018 | Garner | G10L 15/08 |
| 2018/0232645 A1 * | 8/2018 | Finkelstein | G06F 1/324 |
| 2018/0309873 A1 * | 10/2018 | Raanani | H04M 3/5175 |
| 2019/0026066 A1 * | 1/2019 | Champy | G10L 17/26 |
| 2019/0057698 A1 * | 2/2019 | Raanani | G06F 3/167 |
| 2019/0279624 A1 * | 9/2019 | Boss | G10L 15/22 |
| 2020/0126536 A1 * | 4/2020 | Farivar | G10L 15/22 |

* cited by examiner

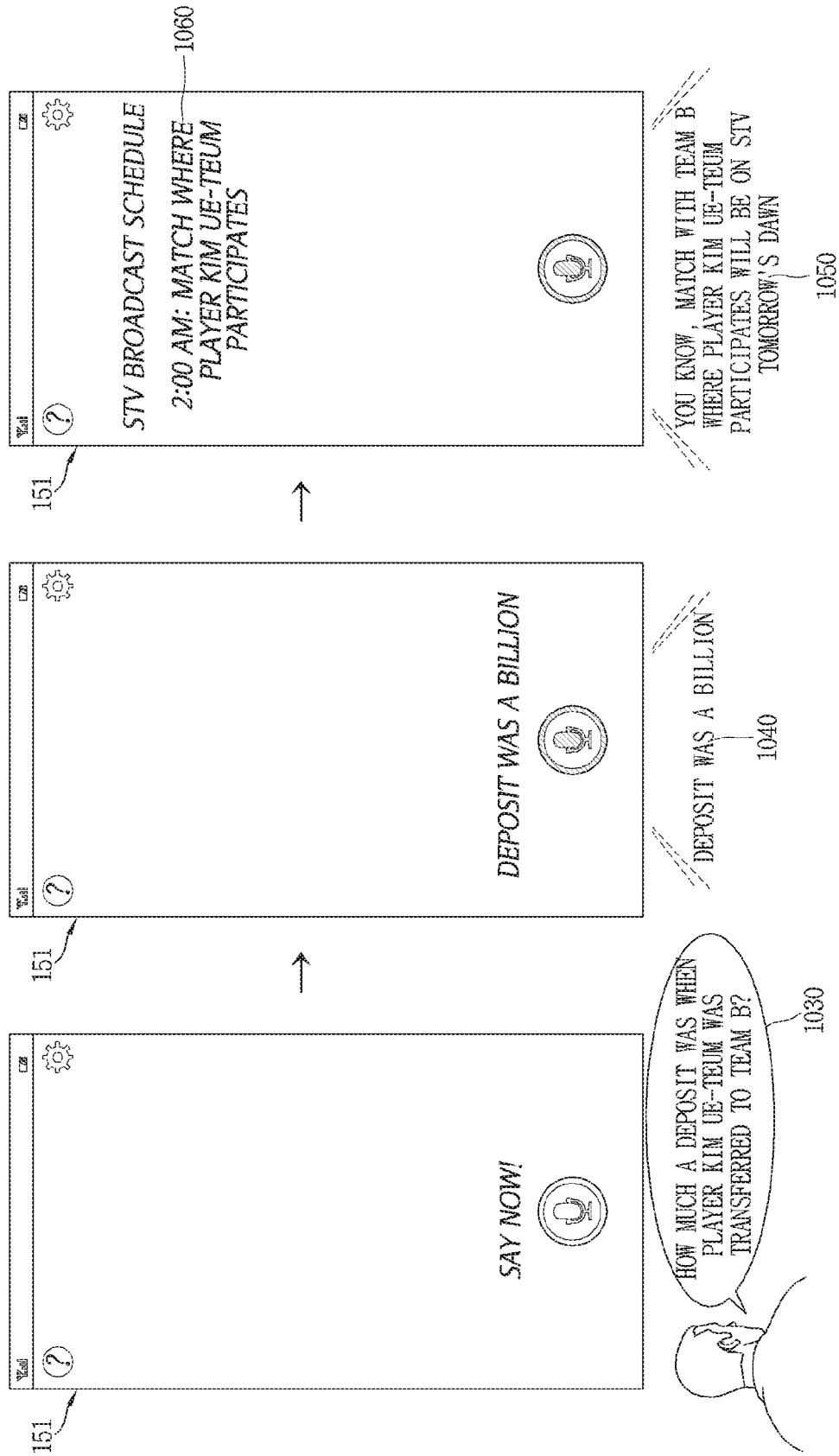

MOBILE TERMINAL AND METHOD FOR CONTROLLING MOBILE TERMINAL USING MACHINE LEARNING

CROSS-REFERENCE TO RELATED APPLICATION

Pursuant to 35 U.S.C. § 119(a), this application claims the benefit of earlier filing date and right of priority to Korean Patent Application No. 10-2017-0102549, filed on Aug. 11, 2017, the contents of which are hereby incorporated by reference herein in its entirety.

BACKGROUND OF THE INVENTION

1. Field of the Invention

The present disclosure relates to a mobile terminal including an artificial intelligence (AI) assistant (or agent) and a method for controlling a mobile terminal using machine learning.

2. Background of the Invention

Artificial intelligence, a field of computer engineering and information technologies to study a method to allow computers to think, learn, and self-improve which can be done by human intelligence, refers to intelligent behaviors by computers.

Artificial intelligence is directly and indirectly related to other fields of computer science, rather than existing by itself. In particular, today, an attempt to introduce artificial intelligent factors in various fields of information technologies to utilize the same to solve problems in the field has been actively made.

Meanwhile, context awareness technologies of perceiving a situation in which a user is placed using artificial intelligence and providing user desired information in a desired form has been actively studied.

In line with the development of the foregoing context awareness technologies, demand for an artificial intelligence agent which processes a user command differently according to users' levels has increased.

SUMMARY OF THE INVENTION

The present disclosure has been made to solve the above-mentioned problems and any other problems.

An aspect of the detailed description is to provide an artificial intelligent agent capable of determining a level of a user by analyzing a language spoken by a user, and performing processing appropriate for the level of the user.

Another aspect of the detailed description is to provide an artificial intelligent agent capable of determining a level of knowledge of a user, a group to which the user belongs, inclination of the user, and the like, by analyzing vocabularies of the user, and processing a control command requested by the user differently according to a determination result.

Another aspect of the detailed description is to provide an artificial intelligent agent capable of making its own decision as to whether a user is qualified to issue a specific control command, and determining whether to perform a control command according to a decision result.

To achieve these and other advantages and in accordance with the purpose of this specification, as embodied and broadly described herein, a mobile terminal having an artificial intelligent agent is provided.

In a specific embodiment, the mobile terminal may include a microphone, a learning data unit configured to identify and store keywords and a controller configured to: activate the microphone in response to an activation event, receive a voice input via the microphone, extract vocabulary information from the received voice input and execute a control corresponding to command information included in the received voice input, wherein the executed control is varied by utilizing the keywords and the extracted vocabulary information.

The controller may be further configured to match a user associated with the received voice input to at least one group of a plurality of groups by comparing the extracted vocabulary information to the keywords where the keywords are associated with corresponding groups of the plurality of groups, and wherein the executed control is executed based on the matched at least one group.

The executed control may comprise outputting a response message in response to the received voice input and the output response message varies for different groups of the plurality of groups.

The outputted response message may vary for different groups of the plurality of groups by using different vocabularies for the response message according to each group.

When the user is matched to more than one group of the plurality of groups, the controller may output a response message corresponding to a selected group of the more than one matched groups.

The selected group may be selected based on a type of the control to be executed.

The controller may be further configured to execute an additional control when an event related to the matched at least one group is identified.

The matched at least one group may comprise a plurality of sub-groups; and the executed additional control may be related to one of the sub-groups of the plurality of sub-groups.

The controller may be further configured to: output an inquiry comprising information of a plurality of sub-groups of the matched at least one group and select a sub-group of the plurality of sub-groups to be matched with the user based on a response input received in response to the output inquiry.

The controller may be further configured to not execute the control when the extracted vocabulary information satisfies a preset condition.

The controller may be further configured to: output a preset inquiry message in response to the received voice input and determine whether to execute the control based on another input received in response to the output preset inquiry message.

The received voice input may be received during a call at the mobile terminal and the executed control comprises outputting a feedback message regarding content of the call based on the extracted vocabulary information when the call is completed.

The activation event may correspond to initiating the call or accepting the call at the mobile terminal.

To achieve these and other advantages and in accordance with the purpose of this specification, as embodied and broadly described herein, a method for controlling a mobile terminal having an artificial intelligent agent is provided. In detail, the method comprising: receiving a voice input, extracting vocabulary information from the received voice input and executing a control corresponding to command information included in the received voice input, wherein the executed control is varied based on a determination by a learning data unit utilizing the keywords and the extracted vocabulary information.

The artificial intelligent agent according to the present disclosure may output different response messages on the basis of extracted vocabulary information. In this manner, by providing a response message with vocabularies appropriate for the user, the user may have a feeling of making conversation with a person similar in level to the user and information appropriate for the level of the user may be provided.

Also, when an event related to a group matched to the user occurs, the artificial intelligent agent according to the present disclosure may perform control related to the event. Accordingly, in the present disclosure, a user's interest may be automatically recognized from words of the user and information appropriate therefor may be automatically provided.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 10A to 10C are conceptual views illustrating an embodiment in which an artificial intelligent agent performs control related to a specific group according to an embodiment of the present disclosure.

DETAILED DESCRIPTION OF THE INVENTION

Figure 1A:
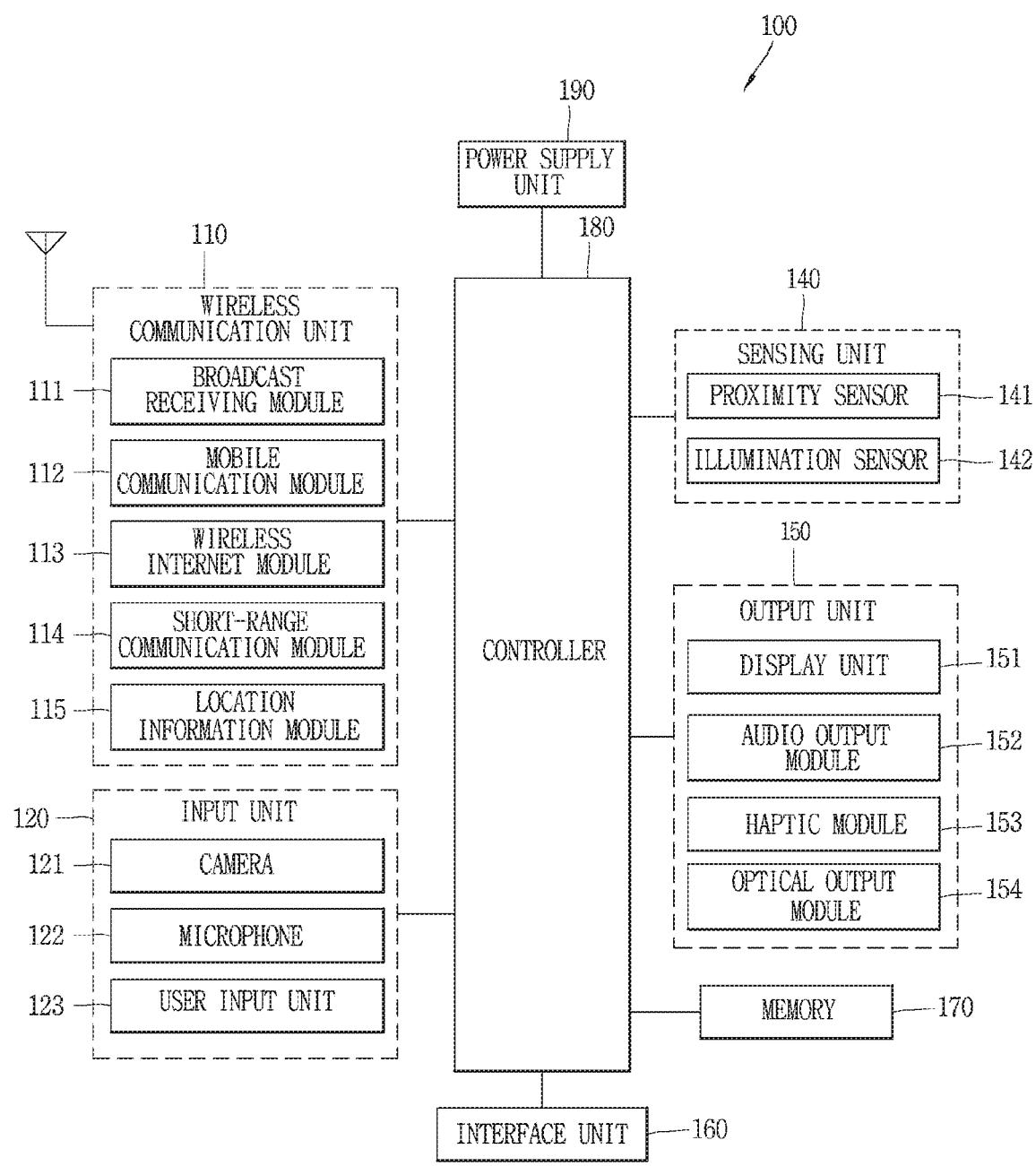
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
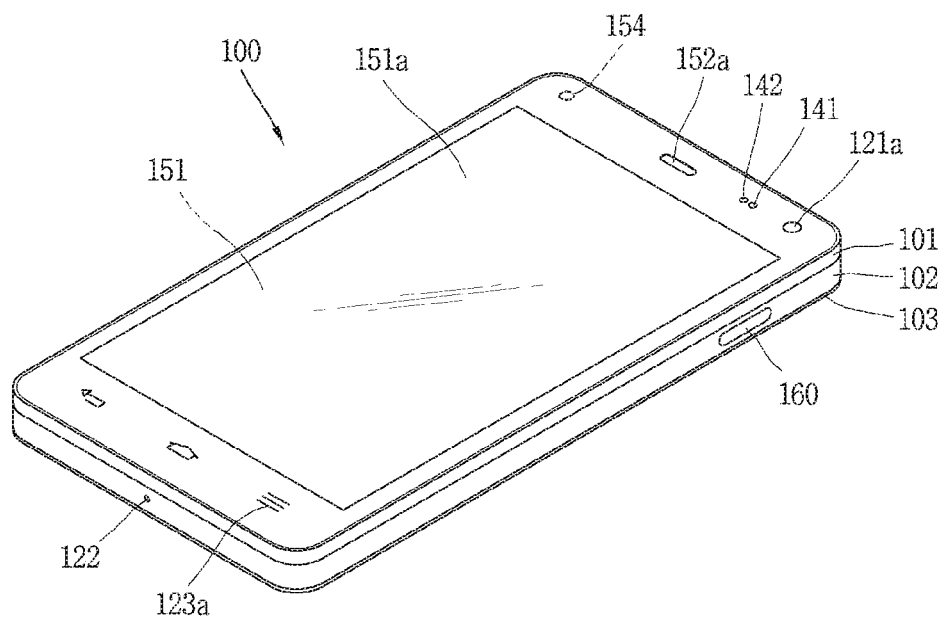
FIGS. 1B and 1C are conceptual views of one example of the mobile terminal, viewed from different directions.
Figure 1C:
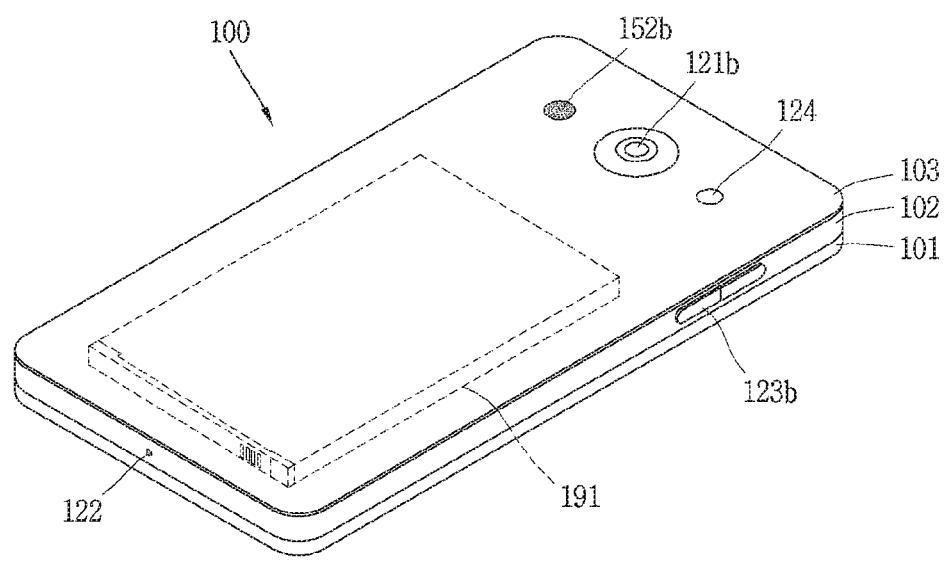

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a learning data unit 130, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The learning data unit 130 may be configured to receive, classify, store, and output information to be used for data mining, data analysis, intelligent decision, and machine learning algorithm and technologies. The learning data unit 130 may include at least one memory unit configured to store information received, detected, sensed, generated, or predefined through a terminal or information output in a different manner through the terminal or store data received, detected, sensed, generated, predefined, or output by another component, device, and terminal.

The learning data unit 130 may include a memory integrated to or provided in a mobile terminal. In an embodiment, the learning data unit 130 may be implemented through the memory 170. However, without being limited thereto, the learning data unit 130 may be implemented in a memory (e.g., an external memory connected to the mobile terminal 100) related to the mobile terminal or may be implemented through a memory included in a server which can communicate with the mobile terminal 100. In another embodiment, the learning data unit 130 may be implemented through a memory maintained in a cloud computing environment or another remote memory accessible by a terminal through the same communication scheme as that of a network.

In order to identify, index, classify, manipulate, store, search, and output data used in generally supervised or unsupervised leaning, data mining, prediction analysis, or another machine learning technology, the learning data unit 130 is configured to store the data in at least one database. Information stored in the learning data unit 130 may be used by the controller 180 using at least one of different types of data analysis, machine learning algorithm, and machine learning technology or a plurality of controllers included in a mobile terminal. Examples of the algorithm and technique include a k-nearest neighbor system, fuzzy logic (e.g., possibility theory), neural networks, Boltzmann machines, vector quantization, pulsed neural nets, support vector machines, maximum margin classifiers, hill-climbing, inductive logic systems, bayesian networks, petri nets (e.g., finite state machines, mealy machines, moore finite state machines), classifier trees (e.g., perceptron trees, support vector trees, markov trees, decision tree forests, random forests), pandemonium models and systems, clustering, artificially intelligent planning, artificially intelligent forecasting, data fusion, sensor fusion, image fusion, reinforcement learning, augmented reality, pattern recognition, automated planning, and the like.

The controller 180 may determine or predict at least one executable operation of the mobile terminal on the basis of information determined or generated using data analysis, a machine learning algorithm, and a machine learning technology. To this end, the controller 180 may request, search, receive, or utilize data of the learning data unit 130. The controller 180 may perform various functions implementing a knowledge-based system, an inference system, a knowledge obtaining system, and the like, and may perform various functions including a system for uncertain inference (e.g., a fuzzy logic system), an adaptation system, a machine learning system, an artificial neural network, and the like.

The controller 180 may include sub-modules allowing for processing a voice and natural language such as an I/O processing module, an environment condition module, a speech-to-text (STT) processing module, a natural language processing module, a work flow processing module, a service processing module. Each of the sub-modules may have authority to access one or more systems, data and model, or a sub-set or super-set thereof in a mobile terminal. Here, targets, for which each of the sub-modules have authority to access, may include scheduling, a vocabulary index, user data, a task flow model, a service model, and an automatic speech translation (ASR) system. In another embodiment, the controller 180 or the mobile terminal may be implemented as the sub-module, system, or data and model.

In some embodiments, on the basis of data from the learning data unit 130, the controller 180 may be configured to detect and sense a user request on the basis of a user input, a context condition expressed by an input of a natural language, or a user intention. Also, the controller 180 may positively derive or obtain information required for completely determining a user request according to a context condition or a user intention. For example, the controller 180 may detect and sense a user request by analyzing past data including past input and output, patterning matching, an unambiguous word, an input intention, and the like. Also, the controller 180 may determine a work flow for executing a function requested by a user according to a context condition or a user intention. Also, the controller 180 may execute a work flow for satisfying user demand on the basis of a context condition or user intention.

In some embodiments, the controller 180 may implement a dedicated hardware element for a learning data process including memristor, memristors, a mutual conductance amplifier, a pulse type neural circuit, an artificial intelligent nano-technology system (e.g., an autonomous nano-machine), or an artificial intelligent quantum machine system (e.g., a quantum neural network), and the like. In some embodiments, the controller 180 may include a pattern recognition system such as a machine vision system, an audio recognition system, a handwriting recognition system, a data fusion system, a sensor fusion system, and a soft sensor. The machine vision system may include content-based image search, optical character recognition, augmented reality, egomotion, tracking, an optical flow, and the like.

The controller 180 may sense or receive information within a mobile terminal, surrounding environment information of the mobile terminal, or any other information through the sensing unit 140. Also, the controller 180 may receive a broadcast signal and/or broadcast-related information, a radio signal, wireless data, and the like, through the wireless communication unit 110. Also, the controller 180 may receive image information (or corresponding signal), audio information (or corresponding signal), data, or information input from a user, through an input unit.

The controller 180 may collect information, process and classify the collected information (e.g., a knowledge graph, a command policy, a personalized database, a conversation engine, etc.), and store the processed or classified information in the memory 170 or the learning data unit 130.

Also, regarding the learning data unit 130, when an operation of the mobile terminal is determined on the basis of data analysis, a machine learning algorithm, and a machine learning technology, the controller 180 may control the components of the mobile terminal to execute the determined operation. The controller 180 may execute the determined operation by controlling the mobile terminal on the basis of a control command.

In an embodiment, when a specific operation is performed, the controller 180 may analyze history information indicating performing of a specific operation through data analysis, the machine learning algorithm, and the machine learning technology, and update existing learned information on the basis of the analysis information. Thus, the controller 180 may enhance accuracy of future performance of the data analysis, the machine learning algorithm, and the machine learning technology based on updated information, together with the learning data unit 130.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The present disclosure relates to a mobile terminal having an artificial intelligent agent. Before describing the present disclosure, an artificial intelligent agent will be described in detail.

An agent refers to an autonomous process performing an operation in the place of a user for a specific purpose.

Here, the agent may be understood as software installed in a mobile terminal, rather than an autonomously existing concept. However, without being limited thereto, the agent may be a system including a mobile terminal and a server capable of perform wireless communication with the mobile terminal. The agent may interact with a user and an external environment through components included in the mobile terminal 100.

In detail, the agent receives command information from the user through components included in the mobile terminal 100 and determines specific control to be performed on the basis of the command information. Thereafter, the agent receives information required for performing the specific control through the components included in the mobile terminal.

In this disclosure, information received from the user to specify control to be performed by the agent will be defined as command information. The command information may be input by various units, and may have different forms according to input units. For example, the command information may be input using at least one of a voice input unit, an image input unit, and a text input unit.

The agent may be classified as a voice recognition-based agent, a text-based agent, and the like, depending on a unit for inputting command information.

For example, the voice recognition-based agent may receive command information formed as voice information through the microphone 122 included in the mobile terminal 100 and perform control related to the received voice information.

In another example, the text-based agent receives text type command information from the user through the touch screen 151 and perform control related to the received text.

Meanwhile, the command information may include various types of information. For example, the command information may include a type of a function operable in the mobile terminal, function execution, starting/ending timing, function execution start/end condition, and the like.

Meanwhile, the artificial intelligent agent described in this disclosure analyzes a meaning of the command information by utilizing data stored in the learning data unit 130 and the controller 180. In detail, when the command information is formed as a natural language, the artificial intelligent agent analyzes a work intended by the user using a natural language processing function of the controller 180. That is, the artificial intelligent agent extracts a type of a function operable in the mobile terminal, a function execution starting/ending time, a function execution starting/ending condition, and the like, from the command information in the natural language.

Also, the artificial intelligent agent predicts (or infers) at least one executable operation of the mobile terminal from the command information using the aforementioned machine learning technology, and controls the mobile terminal to execute an operation with highest possibility of realization among the at least one predicted operation.

In this disclosure, for the purposes of description, it is described that the artificial intelligent agent controls the components of the mobile terminal, but since the artificial intelligent agent is substantially implemented by data stored in the learning data unit 130 and the controller 180, it may be described that the controller 180 controls the components of the mobile terminal by utilizing the data stored in the learning data unit 130. That is, in the present disclosure, control by the artificial intelligent agent and control by the controller 180 utilizing data stored in the learning data unit 130 are substantially the same.

Meanwhile, the artificial intelligent agent according to the present disclosure may be applied to various types of agent. For example, the artificial intelligent agent according to the present disclosure may be applied to a voice recognition-based agent and a text-based agent. Hereinafter, such application examples will be described.

First, an artificial intelligent agent implemented on the basis of voice recognition will be described.

The voice recognition-based agent receives a voice spoken by the user through the microphone 122. Here, ambient noise, conversion, and the like, may be recognized as command information. For example, a person's voice output from a TV may be recognized as command information.

In order to clearly distinguish between ambient noise and command information spoken by the user, only when a voice of a specific keyword is recognized, the voice recognition-based agent may recognize voice information received thereafter as command information. For example, only when a voice of "Hello LG" is recognized, the voice recognition-based agent may recognize voice information received thereafter as command information.

In this disclosure, a state in which voice information received after a specific keyword is recognized is recognized as command information will be defined as a state in which voice recognition is activated. According to this definition, a voice of the specific keyword may be differentiated from command information. In this disclosure, the voice of the specific keyword will be expressed as "wake-up signal". That is, the wake-up signal is a voice signal for activating voice recognition of the agent.

Meanwhile, the wake-up signal may be understood as a voice signal for executing agent software, in addition to activation of voice recognition of the agent.

Meanwhile, after the wake-up signal is recognized, the voice recognition-based agent may recognize only voice information received for a predetermined period of time, as command information, or in case where voice information is not received for the predetermined period of time, the voice recognition-based agent may switch voice recognition to a deactivated state or when a timing at which user's speaking is finished is sensed, the voice recognition-based agent may switch voice recognition to the deactivated state.

In the above, the voice recognition-based agent has been described. Hereinafter, a user interface of the voice recognition-based agent utilizing the wake-up signal will be described.

Figure 2:
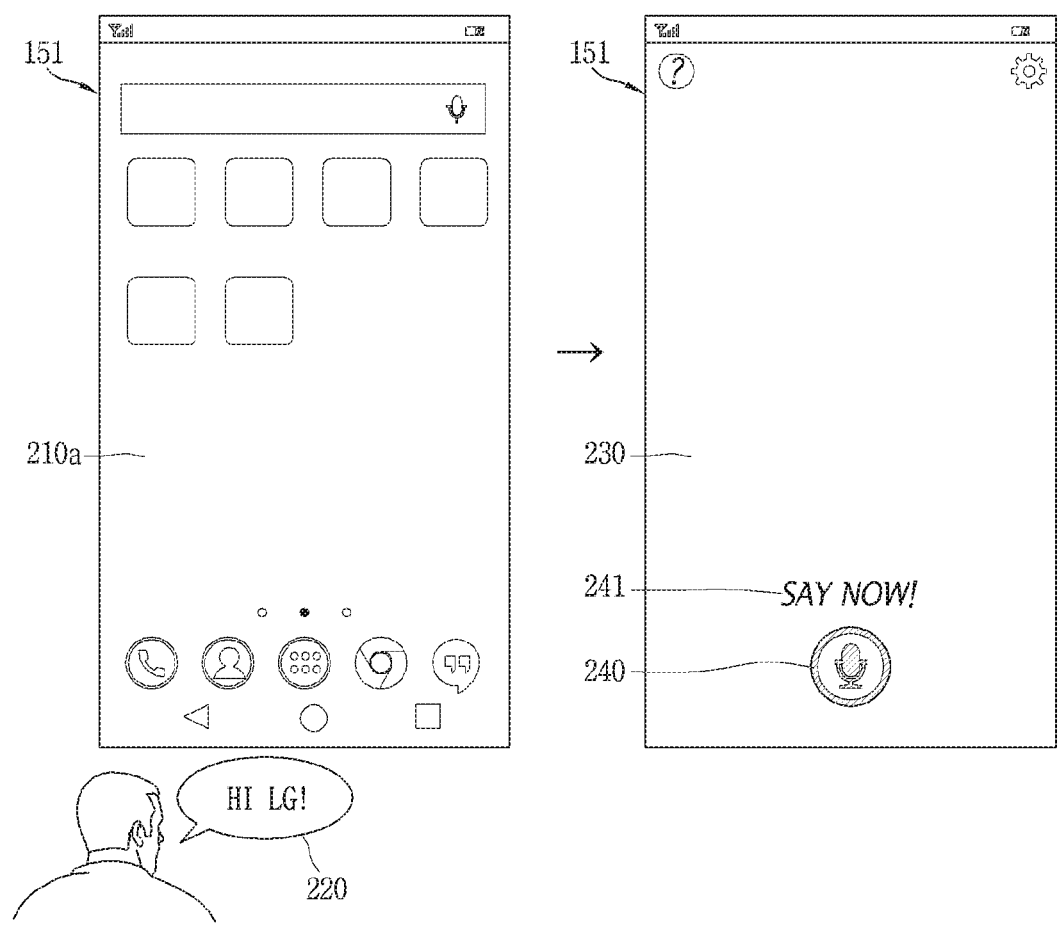
FIGS. 2 and 3 are conceptual views illustrating an embodiment of executing a voice recognition-based agent provided in a mobile terminal.
Figure 3:
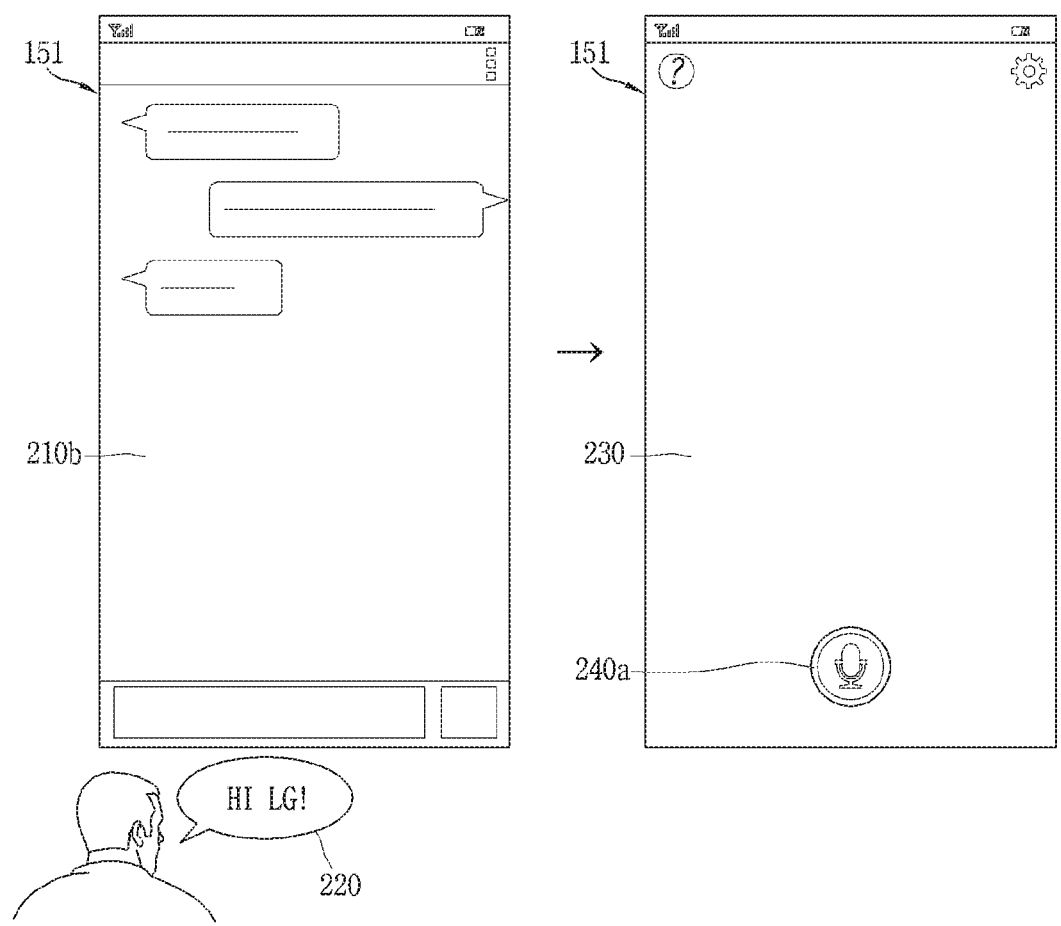

FIGS. 2 and 3 are conceptual views illustrating an embodiment of executing the voice recognition-based agent provided in the mobile terminal.

The user may execute the voice recognition-based agent by speaking the specific keyword. Referring to FIG. 2, when the user speaks wake-up signal 220 (i.e., "Hello LG!"), the artificial intelligent agent is executed.

Here, in order to receive the wake-up signal 220 from the user, the microphone 122 of the mobile terminal may be maintained in a driven state all the time. However, the mobile terminal does not perform control by received voice information until the wake-up signal 220 is received.

When the wake-up signal 220 is received, the mobile terminal may execute the voice recognition-based agent and displays an execution screen 230 of the voice recognition-based agent, instead of currently displayed screen information 210a. The currently displayed screen information may be a home screen of the mobile terminal or may be an execution screen of an application. Meanwhile, a graphic object guiding whether to activate voice recognition may be displayed on an execution screen of the voice recognition-based agent.

Meanwhile, when the wake-up signal 220 is received, the mobile terminal may display an execution screen of the voice recognition-based agent and activate voice recognition. That is, when the wake-up signal 220 is received, the mobile terminal may execute the voice recognition-based agent and immediately switch voice recognition to an activated state. Here, a graphic object 240 (hereinafter, referred to as a "microphone icon") guiding whether to activate voice recognition and a sentence 241 indicating that voice recognition is activated.

Meanwhile, when the wake-up signal 220 is received, the mobile terminal may execute only the voice recognition-based agent and may not switch voice recognition to an activated state.

Referring to FIG. 3, when a messenger wake-up signal 220 is received, the mobile terminal displays an execution screen 230 of the voice recognition-based agent. Here, voice recognition is in a deactivated state and the microphone icon indicates that voice recognition is deactivated state.

Meanwhile, as illustrated in FIG. 2, when receiving voice information is completed in a state in which voice recognition is activated or in case where voice information is not input for a predetermined period of time, voice recognition may be switched to a deactivated state.

As described above, voice recognition may be deactivated while the voice recognition-based agent is being executed, and here the user may activate voice recognition in various manners.

Figure 4:
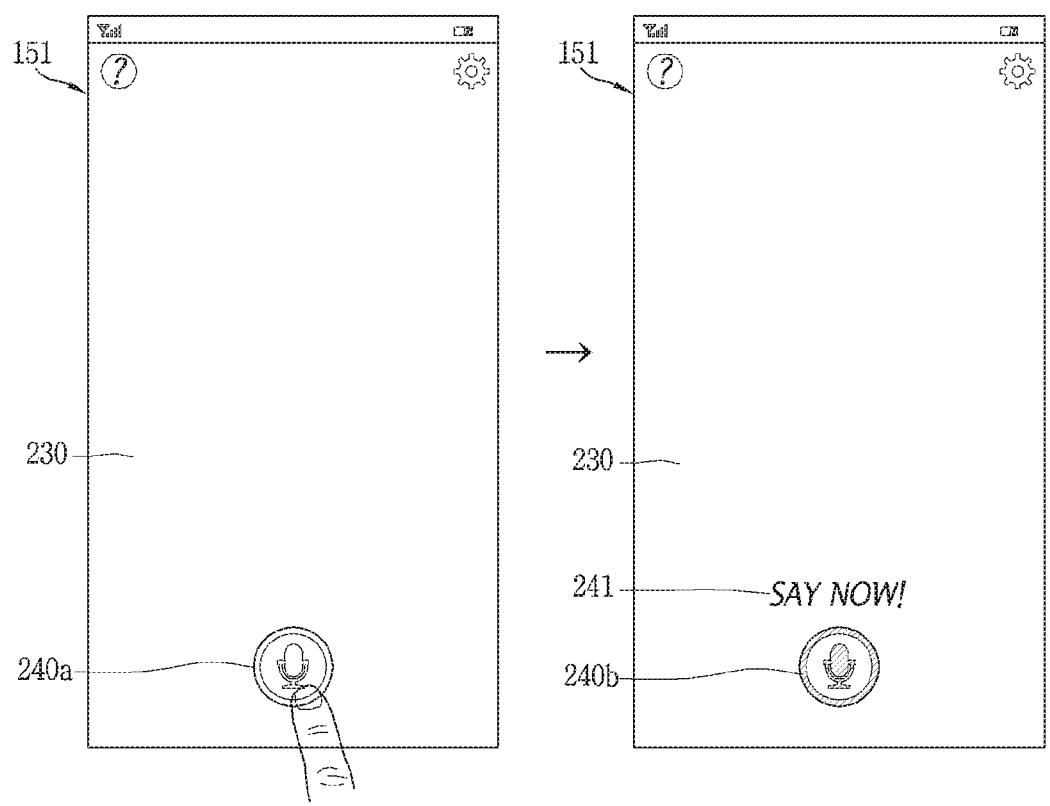
FIGS. 4 and 5 are conceptual views illustrating an embodiment of activating voice recognition while a user is executing a voice recognition-based agent.
Figure 5:
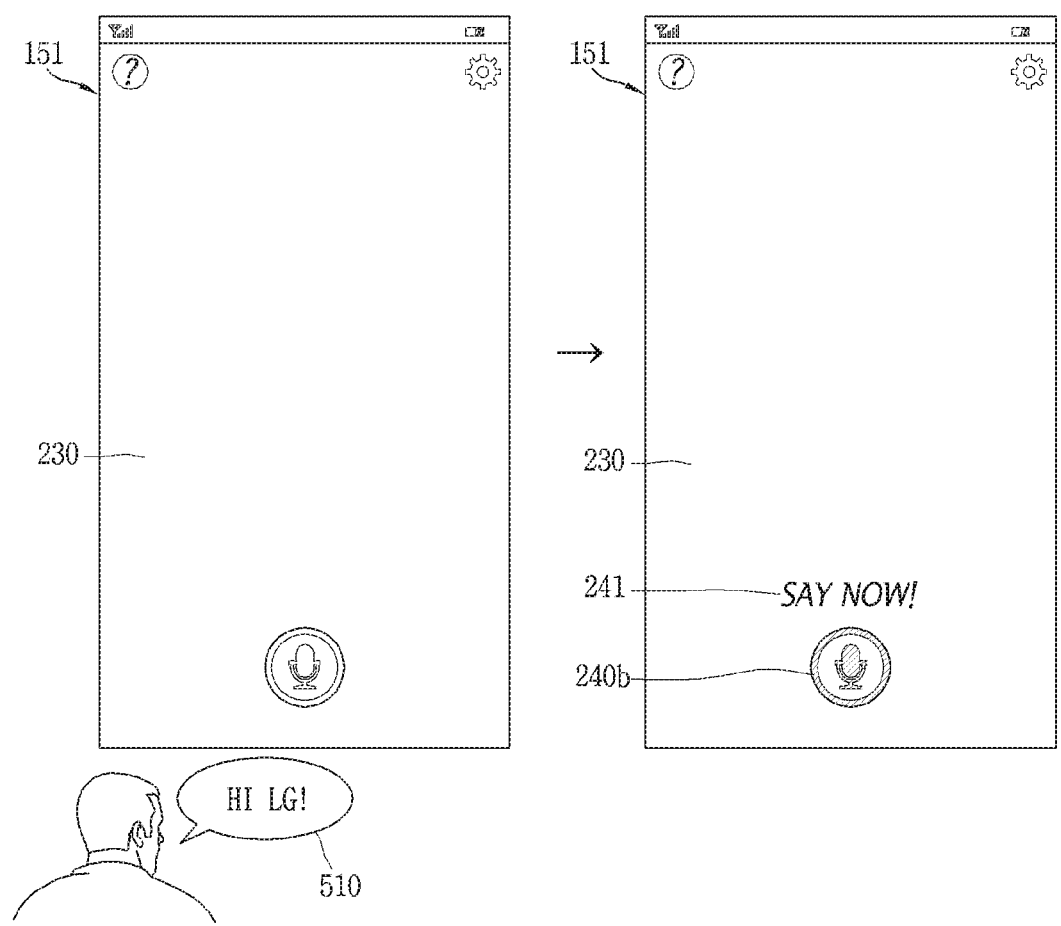

FIGS. 4 and 5 are conceptual views illustrating an embodiment of activating voice recognition while the user is executing the voice recognition-based agent.

First, the user may activate voice recognition by applying a touch input to the touch screen 151. Referring to FIG. 4, the microphone icon 240 may be displayed in two states 240a and 240b depending on whether voice recognition is activated. In this disclosure, a microphone icon indicating a deactivated state of voice recognition will be referred to as an OFF-state microphone icon 240a and a microphone icon indicating an activated state of voice recognition will be referred to as an ON-state microphone icon 240b.

Referring to FIG. 4, while the OFF-state microphone icon 240a is displayed, when a touch is applied to the OFF-state microphone icon 240a, the mobile terminal switches voice recognition to an activated state and displays the ON-state microphone icon 240b.

On the other hand, referring to FIG. 5, when a specific keyword 510 is received, the mobile terminal may switch voice recognition to an activated state. here, the specific keyword 510 may be the same as the wake-up signal described above with reference to FIGS. 2 and 3.

As described above with reference to FIGS. 4 and 5, the use may switch voice recognition to an activated state using the touch screen 151 and the microphone 122. When voice recognition is activated, the user may apply command information by speaking.

Figure 6:
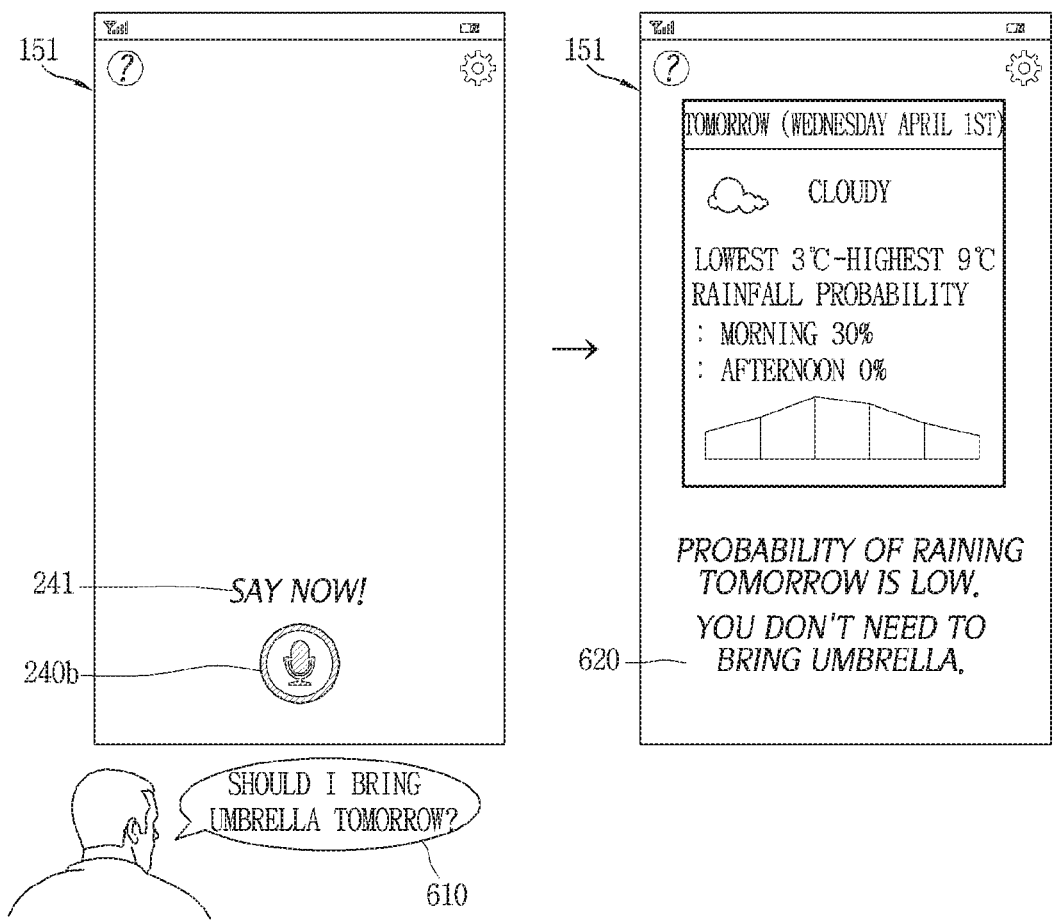
FIG. 6 is a conceptual view illustrating an embodiment of performing control related to voice information applied to a voice recognition-based agent.

FIG. 6 is a conceptual view illustrating an embodiment of performing control related to voice information applied to a voice recognition-based agent.

Referring to FIG. 6, while the ON-state microphone icon 240b is displayed, a voice signal 610 (i.e., "Should I bring umbrella tomorrow?") is spoken. When the artificial intelligent agent according to the present disclosure is applied to the voice recognition-based agent, the artificial intelligent agent may convert the received voice signal into text and interpret a meaning of the converted text. The artificial intelligent agent perform control to provide weather information of tomorrow according to an interpretation result. Here, in order to search weather of tomorrow, the artificial intelligent agent may utilize a server which can wirelessly communicate with the mobile terminal. When searching weather of tomorrow is completed, the artificial intelligent agent displays a search result 620 on the touch screen 151.

As described above, when the voice recognition-based agent is used, the user may execute various functions even without contacting the mobile terminal.

Meanwhile, an application target of the artificial intelligent agent according to the present disclosure is not limited to the voice recognition-based agent. For example, the artificial intelligent agent according to the present disclosure may also be applied to the text-based agent.

Figure 7:
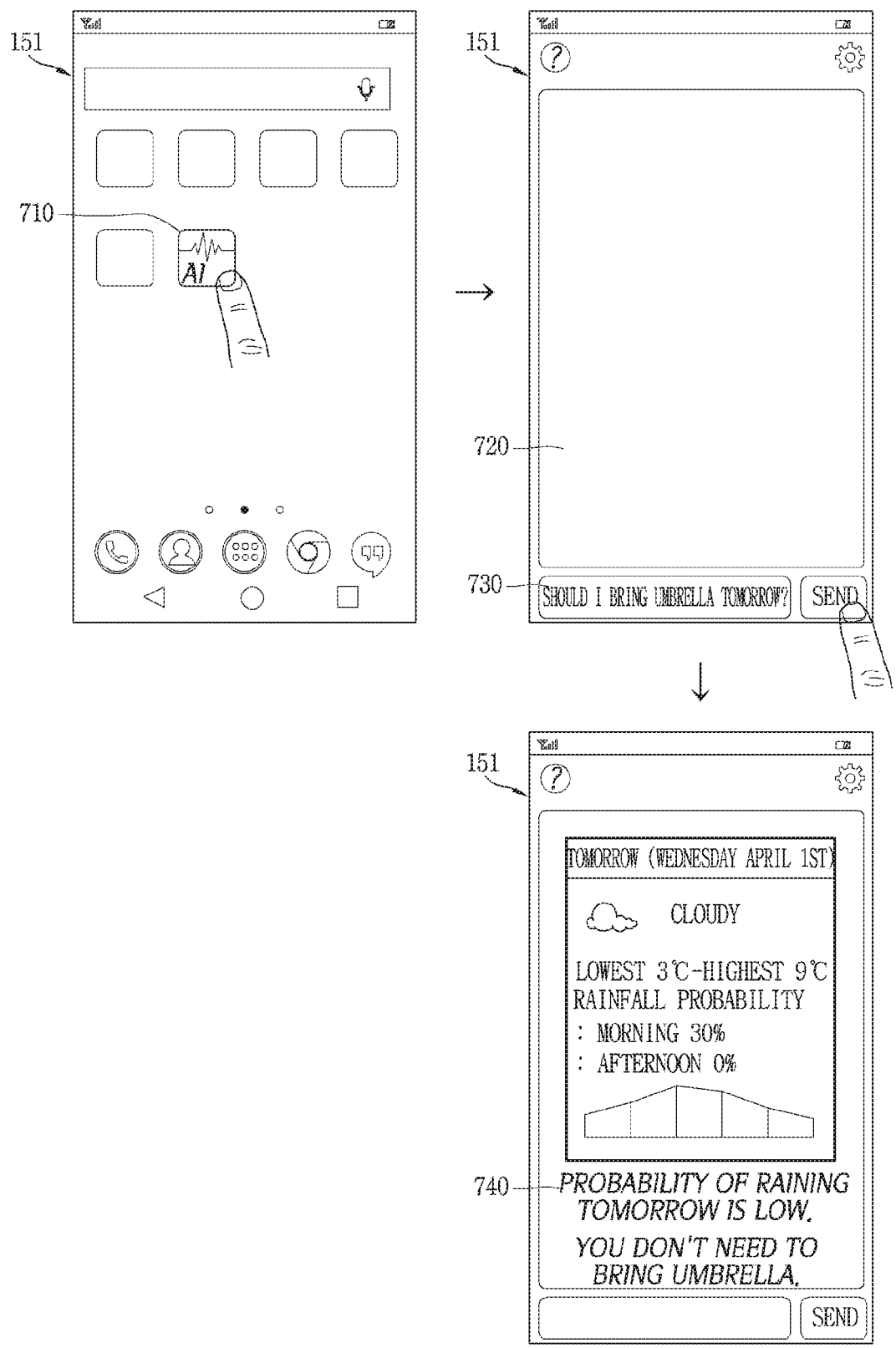
FIG. 7 is a conceptual view illustrating an embodiment of a text-based agent.

FIG. 7 is a conceptual view illustrating an embodiment of a text-based agent.

Referring to FIG. 7, the text-based agent may be executed by applying a touch input to an icon 710 corresponding to the agent. That is, the text-based agent may be executed in the same execution manner as that of a general application.

An execution screen 720 of the text-based agent may be similar to an execution screen of a messenger application. When the user inputs text 730 to a text input window and touches a send button, the artificial intelligent agent-applied text-based agent may recognize text input to the text input window, as command information, and perform control corresponding to the command information. When controlling is completed, the artificial intelligent agent may display a control result 740 on the execution screen 720 of the agent.

When command information is applied in a text form, ambient noise, or the like, is not problematic, and thus, the text-based agent does not use a wake-up signal.

In the above, the artificial intelligent agent implemented on the basis of voice recognition and text has been described. The voice recognition-based agent has shortcomings in that it is difficult to apply voice information when ambient noise is large, and the text-based agent has a problem in that it takes long time to apply command information to the artificial intelligent agent because the user should directly input a text message.

In case where command information is applied to an artificial intelligent agent using a camera included in the mobile terminal, the problem arising in the artificial intelligent agent implemented on the basis of voice recognition and text may be solved. Also, in case where command information in the form of image information is applied to the artificial intelligent agent, the artificial intelligent agent may perform various controls.

The artificial intelligent agent according to the present disclosure allows the user to apply command information through a camera, and performs control related to command information. Hereinafter, a control flow of the controller 180 to implement control related to command information will be briefly described.

The artificial intelligent agent according to the present disclosure may perform control corresponding to the command information differently according to user levels. Hereinafter, a method for controlling a mobile terminal according to the present disclosure will be described in detail.

Figure 8:
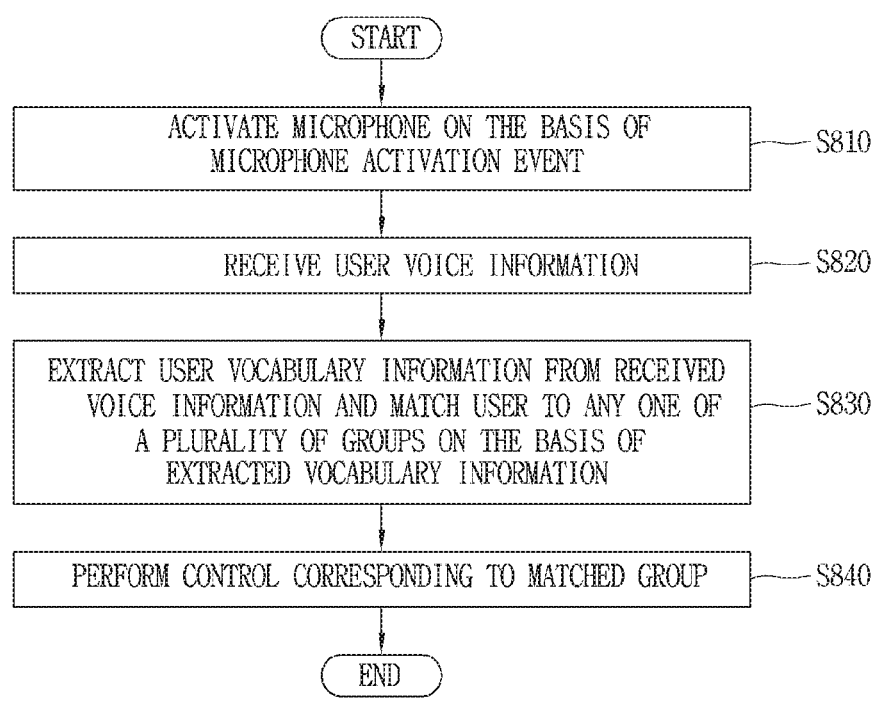
FIG. 8 is a flow chart illustrating a method for controlling a mobile terminal according to an embodiment of the present disclosure.

FIG. 8 is a flow chart illustrating a method for controlling a mobile terminal according to an embodiment of the present disclosure.

First, in the mobile terminal according to the present disclosure, the microphone is activated according to an activation event of the artificial intelligent agent (S810) and voice information is received from the user (S820).

Here, the activation event of the artificial intelligent agent may be the event for activating voice recognition described above with reference to FIGS. 4 and 5. That is, when an event such as sensing a "wake-up signal", or the like, occurs, the mobile terminal according to the present disclosure receives voice information from the user.

Meanwhile, the activation event of the artificial intelligent agent is not limited to sensing the "wake-up signal" and may be executing a specific function in the mobile terminal. For example, the activation event of the artificial intelligent agent may be starting call communication. In this case, the artificial intelligent agent may receive voice information of the user received during call communication, and perform control corresponding to the received voice information after the call communication is finished. A specific embodiment thereof will be described hereinafter.

Thereafter, the artificial intelligent agent extracts vocabulary information of the user from the voice information and matches the user to any one of a plurality of groups on the basis of the extracted vocabulary information (S830).

Here, the vocabulary information may define at least one of a kind of language, a regional dialect, languages of various social stratum and language of each professional field (hereinafter, referred to as a "social dialect"), a language system used by an individual, and a sentence construction power, as well as a type and frequency of a word used by the user. That is, vocabulary information defines a language system utilized by a specific user for communication.

The vocabulary information may be collected from a plurality of users through terminals equipped with an artificial intelligent agent. Among users as vocabulary information collecting targets, some of the users whose vocabulary information is similar to each other may be classified as a specific group. Here, the users may belong to one group or may belong to a plurality of groups according to categories classifying groups.

For example, when groups are classified by an occupation category, groups such as athletes, programmers, doctors, and the like, may be formed, and when groups are classified by a dialect category, groups such as Kyoungki-do, Kyoungsang-do, Jeolla-do, Chungcheong-do, and the like, may be formed. A specific user may belong to any one of a plurality of groups classified by the occupation category and belong to the groups classified by the dielectric category.

However, the present disclosure is not limited thereto and characteristics of a group itself to which a plurality of users belong may not be defined. For example, users with high usage frequency of medical terms may be classified as the same group and may not be classified as a doctor group of the corresponding group. However, although a characteristic of a group is not defined, vocabulary information corresponding to a specific group may be defined. For example, a group of users with high usage frequency of medical terms may be defined as a group with a high usage frequency of medical terms, rather than being defined as a doctor group.

When vocabulary information is collected from a plurality of users and analyzed, groups may be formed by age, occupation, an educational level, gender, and a matter of interest of users, and a group to which vocabulary information extracted from voice information belongs, among previously formed groups, may be analyzed to analyze a disposition of the user. The collected vocabulary information may be stored in the learning data unit 130, and the controller 180 may use the vocabulary information stored in the learning data unit 130 as necessary.

Thereafter, the mobile terminal according to the present disclosure performs control corresponding to the voice information (S840). The artificial intelligent agent recognizes voice information received after an activation event of the artificial intelligent agent, as command information, and performs control corresponding to the command information.

Here, the artificial intelligent agent may perform control corresponding to the command information on the basis of the extracted vocabulary information differently.

As described above, the command information may include a type of a function operable in the mobile terminal, a function execution starting/ending timing, a function execution starting/ending condition, and the like. Although the artificial intelligent agent according to the present disclosure receives the same command information from the user, if vocabulary information extracted from voice information is different, the artificial intelligent agent may perform control corresponding to the command information differently.

Here, performing control differently may be at least one of guiding a specific control execution result differently, differentiating a range of information to be provided to the user, and determining whether to execute specific control through a separate authentication procedure, rather than differentiating a function defined by command information, a function execution condition, and the like. However, the present disclosure is not limited thereto and the artificial intelligent agent according to the present disclosure may perform control differently according to extracted vocabulary information without distorting substantial control defined by the command information.

Hereinafter, embodiments in which control based on command information is performed differently according to vocabulary information extracted by the artificial intelligent agent will be described.

Figure 9A:
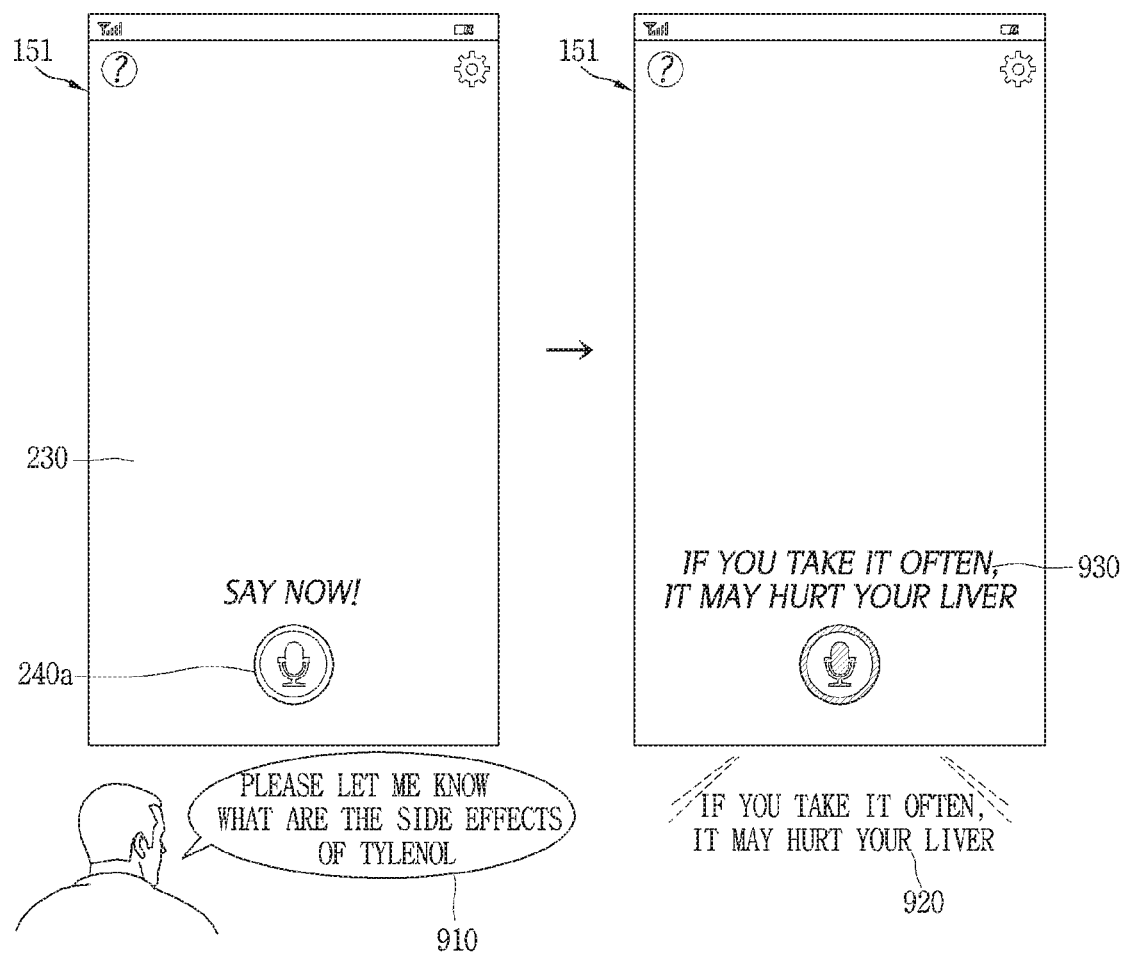
FIGS. 9A and 9B are conceptual views illustrating an embodiment of outputting different response messages according to vocabularies of a user.
Figure 9B:
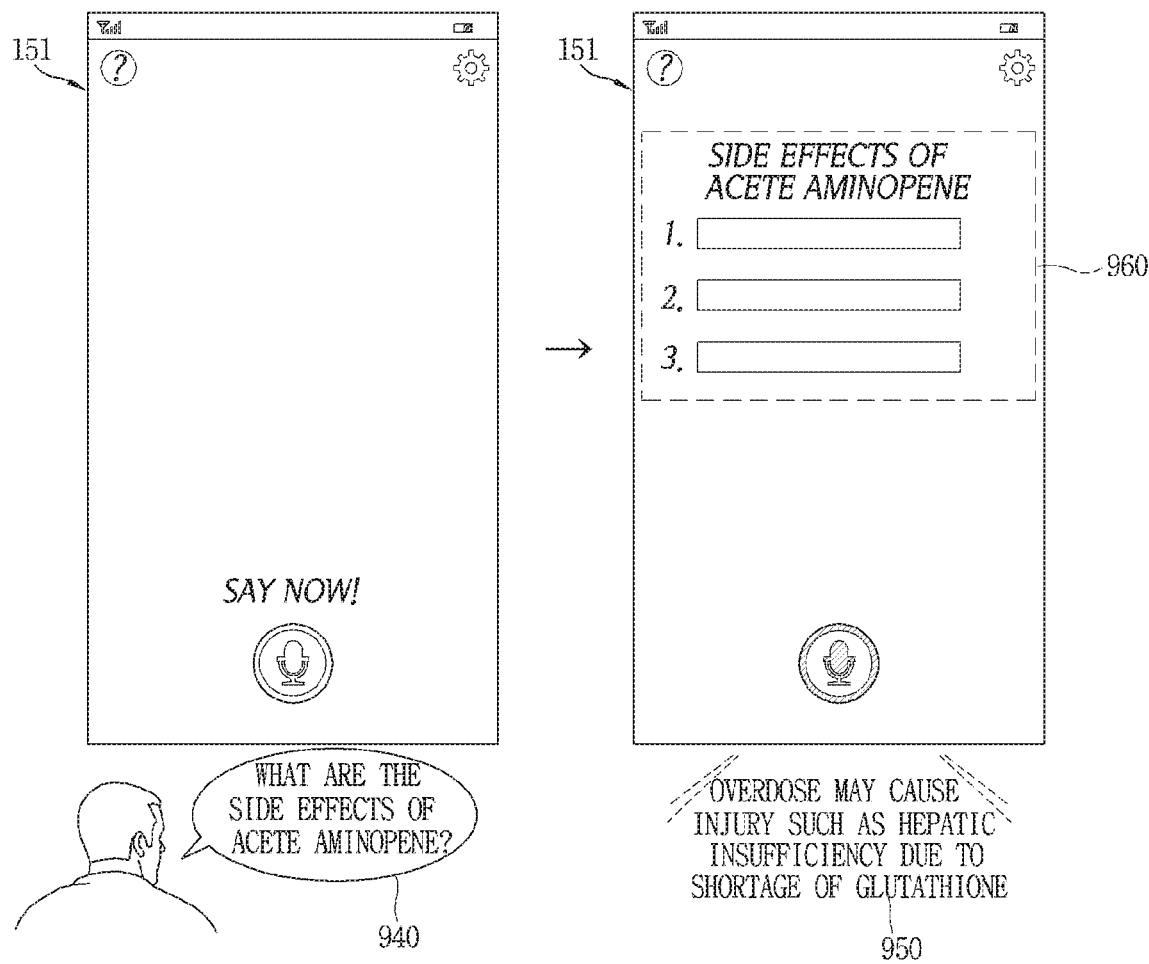

FIGS. 9A and 9B are conceptual views illustrating an embodiment of outputting different response messages according to vocabularies of a user.

The artificial intelligent agent according to the present disclosure may output a response message according to command information included in voice information. Here, the artificial intelligent agent may output different response messages according to extracted vocabulary information.

Here, the response message may define guiding of a control performance result corresponding to the command information, or command information itself may define outputting a specific response message. For example, when the command information defines ordering specific goods, the response message may be a message indicating that ordering was completed. Meanwhile, when the command information defines providing of weather information, the response message may be weather information itself.

According to extracted vocabulary information, the artificial intelligent agent according to the present disclosure may guide a control performance result in different manners or provide specific information requested by the user in different manners.

First, an embodiment in which the artificial intelligent agent guides specific control performance result in different manners according to extracted vocabulary information will be described in detail. The artificial intelligent agent generates a response message to guide control performance result, and here, the artificial intelligent agent may generate a response message using specific vocabulary information. For example, the artificial intelligent agent may generate a response message using vocabulary information defining words frequently used by people in their twenties. Vocabulary information utilized by the artificial intelligent agent to generate a response message may be information stored in the terminal, a preset server, and the like, and may be various in kind. That is, the artificial intelligent agent may generate a response message using the vocabulary information stored in the learning data unit 130.

The artificial intelligent agent may compare the extracted vocabulary information and previously stored vocabulary information, and form a response message using vocabulary information with highest consistency.

Also, the artificial intelligent agent may match a user who applies voice information using the extracted vocabulary information to a specific group, and form a response message using vocabulary information with highest consistency with vocabulary information corresponding to the matched group, among previously stored pieces of vocabulary information.

For example, in case where the user applies command information to request an order request of specific goods by a Kyeongsang-do dialect, the artificial intelligent agent may order the specific goods through a preset server and output a message indicating completion of ordering in the Kyeongsang-do dialect.

Meanwhile, the artificial intelligent agent may provide specific information requested by the user in different manners according to extracted vocabulary information.

In detail, in case where command information received from the user defines providing of specific information, the artificial intelligent agent may search information corresponding to the command information received from the user. The artificial intelligent agent may selectively output a portion of searched data to the user, rather than outputting searched information as is.

The artificial intelligent agent may match the user to any one of a plurality of groups on the basis of the vocabulary information and select information to be provided to the user according to the matched group.

For example, in case where information requested by the user is information regarding side effects of a specific medicine, the artificial intelligent agent may search various information regarding the specific medicine. Searched information may include information including medical terminology, information in a language used by layman, and the like. When the matched group is a group of medical experts, the artificial intelligent agent may selectively output information including medical terminology to the user, and in case where the matched group is a group of laymen, the artificial intelligent agent may selectively output information in a language used by laymen to the user.

Hereinafter, the foregoing embodiment will be described in detail with reference to FIGS. 9A and 9B.

Referring to FIG. 9A, in case where the artificial intelligent agent receives voice information 910 of "please let me know what are the side effects of Tylenol" from the user, the artificial intelligent agent searches side effect information regarding "Tylenol".

Meanwhile, the artificial intelligent agent extracts vocabulary information from the voice information received from the user and match the user to at least one of a plurality of groups on the basis of the extracted vocabulary information.

Here, the artificial intelligent agent may match the user to a category including laymen among categories related to medicine. According to the matching result, the artificial intelligent agent may output information ("It's bad for liver") including a language used by laymen, among searched medical information. Here, a response message may be output in at least one of a voice information form 920 and a text form 930.

Referring to FIG. 9B, when voice information 940 of "What are the side effects of acete aminopene?" is received from the user, the artificial intelligent agent searches side effect information regarding "acete aminopene". Here, since "Tylenol" described above with reference to FIG. 8A and "acete aminopene" are the same material, the artificial intelligent agent searches the same information.

Meanwhile, on the basis of the fact that the user uses the term "acete aminopene" used by medical experts, rather than the term "Tylenol" mainly used by laymen, the artificial intelligent agent may match the user to a group of medical experts.

According to the matching result, the artificial intelligent agent may output information ("Injury such as hepatic insufficiency may occur") in a language used by experts among medical information. Here, the artificial intelligent agent may output information with highest priority, among the searched information, in a voice information form 950 and output the other remaining information in a text form 960. Here, the artificial intelligent agent may set priority of searched information on the basis of the number of times of performing search.

As described above, the artificial intelligent agent according to the present disclosure may output different response messages on the basis of extracted vocabulary information. In this manner, by providing a response message with vocabularies appropriate for the user, the user may have a feeling of making conversation with a person similar in level to the user and information appropriate for the level of the user may be provided.

Meanwhile, the artificial intelligent agent may match the user to each of the plurality of groups. As described above, a plurality of categories dividing groups may be provided and a plurality of groups may be formed by categories. A specific user may be matched to a group belonging to any one of the plurality of categories and may be matched to a group belonging to a category different from the any one category. That is, the user may be matched to a plurality of groups.

In this case, the artificial intelligent agent may output a response message corresponding to at least one of the plurality of groups matched to the user. Here, the artificial intelligent agent may select at least one of the plurality of groups matched to the user and output a response message corresponding to the selected group.

The artificial intelligent agent may select at least one of the plurality of groups matched to the user according to command information included in the voice information received from the user. In detail, when the command information defines outputting of specific information, the artificial intelligent agent may select a group with highest relevance with the specific information, from among the plurality of groups matched to the user.

For example, when the user questions about "side effects" of "acete aminopene" in Kyoungsang-do dialect, the artificial intelligent agent may match the user to each of a medical expert group and a Kyoungsang-do dialect group. Thereafter, the artificial intelligent agent may select a medical expert group with highest relevancy with "acete aminopene" and provide a response message corresponding to the selected group. Since the response message is output with different vocabularies according to selected groups by the learning data, as types of groups that can be selected by the learning data are increased, a response message may be provided with various vocabularies.

Meanwhile, after the artificial intelligent agent according to the present disclosure matches the user to the specific group, when an event related to the matched group occurs, the artificial intelligent agent may guide the occurrence of event to the user.

Figure 10A:
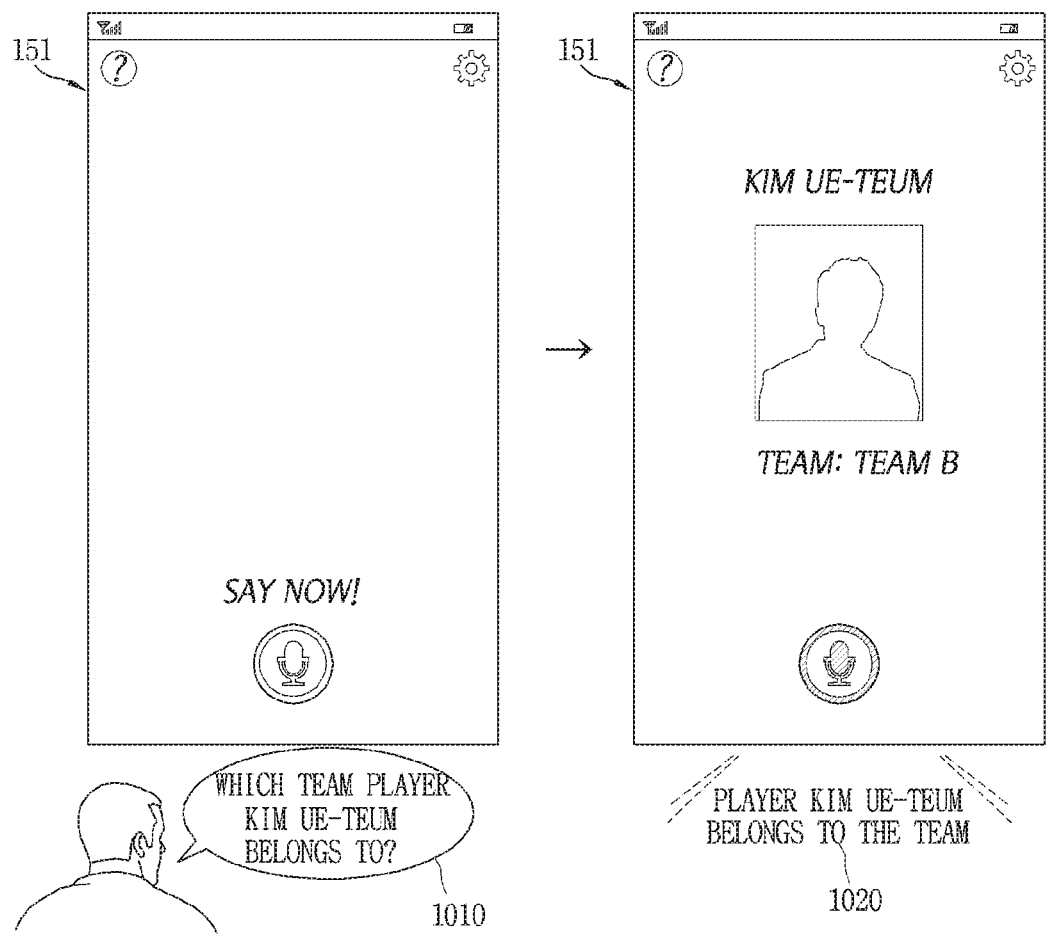
Figure 10C:
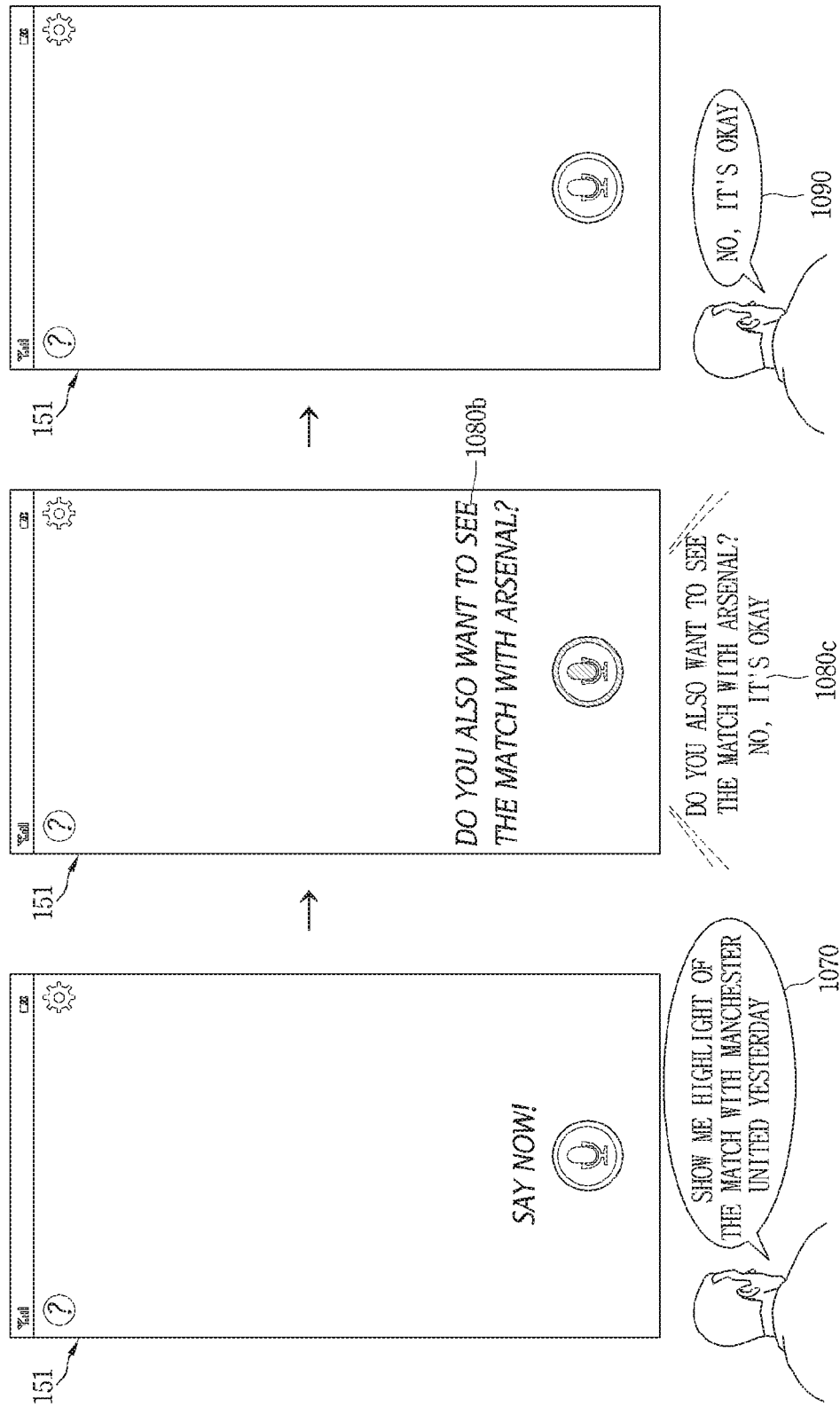

FIGS. 10A to 10C are conceptual views illustrating an embodiment in which an artificial intelligent agent performs control related to a specific group according to an embodiment of the present disclosure.

In case where the user applies specific command information to the artificial intelligent agent through a voice, the artificial intelligent agent matches the user to a specific group. The group to which the user is matched may not be changed unless the user applies any other command information, or the like.

In a state in which the user is matched to the specific group, when an event related to the specific group occurs, the artificial intelligent agent may perform control corresponding to the event.

Here, the event may be an event of updating a specific type of information or an event regarding a specific application. When the user is matched to the specific group, the artificial intelligent agent may periodically monitor specific information or a specific application. Here, the specific information may be periodically monitored through a preset search engine, or the like.

Meanwhile, control related to the event may be guiding updated specific information or executing a specific application.

An embodiment in which when specific information is updated, the artificial intelligent agent performs control in relation thereto will be described with reference to FIGS. 10A and 10B.

Referring to FIG. 10A, the artificial intelligent agent extracts vocabulary information from voice information ("to which team player Kim Ue-teum belongs?") 1010 received from the user. When the user knows very little about the "player Kim Ue-teum", the artificial intelligent agent may not match the user to a group of users who are interested in the "player Kim Ue-teum". Thereafter, the artificial intelligent agent does not monitor information related to the "player Kim Ue-teum". Apart from this, the artificial intelligent agent may output a response message 1020 regarding the voice information 1010.

Meanwhile, referring to FIG. 10B, the artificial intelligent agent extracts vocabulary information from voice information ("How much a deposit was when player Kim Ue-teum was transferred to team B?") 1030 received from the user. On the basis of the fact that the user has information regarding "player Kim Ue-teum" and information indicating that "player Kim Ue-teum belongs to the team B" and that "player Kim Ue-teum was transferred to another team", the artificial intelligent agent may match the user to the group of users who are interested in the "player Kim Ue-teum". Apart from this, the artificial intelligent agent may output a response message 1040 regarding the voice information 1030.

In this case, the artificial intelligent agent may periodically monitor information related to the "player Kim Ue-teum". When information related to the "player Kim Ue-teum" is searched, the artificial intelligent agent may output a message 1050 or 1060 guiding the same.

Meanwhile, at least one of the plurality of groups described above may include a plurality of sub-groups. A sub-group is a set of users whose similarity in vocabulary information is a predetermined level or higher, among users matched to the same group. That is, the sub-group is a group of users whose similarity in vocabulary information is particularly high, among the users who belong to the same group.

For example, a group of users who frequently use words related to soccer may be formed, and a sub-group may be formed with respect to the number of using a word related to a specific soccer team.

Meanwhile, in case where the number of users whose similarity in vocabulary information is equal to or higher than a predetermined level, among the users who belong to the same group, is smaller than a preset value, a sub-group may not be formed.

Meanwhile, in case where the group matched to the user includes a plurality of sub-groups, the artificial intelligent agent may select at least one of the plurality of sub-groups, and only when an event related to the selected sub-group occurs, the artificial intelligent agent may perform control corresponding to the event.

The artificial intelligent agent may match the user to a specific group on the basis of the vocabulary information extracted from the voice information received from the user, and here, it may be difficult to completely specify a group to which the user belongs only with the extracted vocabulary information.

For example, in case where words such as "soccer", "watching a soccer game", or "watching a soccer game" are frequently detected from voice information received from the user, the artificial intelligent agent may match the user to a group of users who frequently use words related to soccer (hereinafter, referred to as a "soccer group"). Here, the soccer group may have a plurality of sub-groups formed according to a degree of interest regarding a specific team. The artificial intelligent agent may not be able to specify a sub-group only with words used by the user.

In this case, the artificial intelligent agent may output an inquiry message related to the sub-group to induce a user input. Here, the user input may be received in the form of voice information or text information. The artificial intelligent agent may select at least one of the sub-groups on the basis of a user input received in response to the inquiry message.

In case where the sub-group is selected, only when an event related to the selected sub-group occurs, the artificial intelligent agent may perform control related to the event.

An embodiment in which the artificial intelligent agent selects any one of sub-groups included in the group matched to the user will be described with reference to FIG. 10C.

Referring to FIG. 10C, when voice information ("Show me highlight of the match with Manchester United yesterday") 1070 is received from the user, the artificial intelligent agent may match the user to a soccer group on the basis of the received voice information. The soccer group may have a plurality of sub-groups formed according to a degree of interest regarding a specific team. Here, since the artificial intelligent agent cannot specify a sub-group corresponding to the user only with the voice information, the artificial intelligent agent may output an inquiry message ("Do you also want to see the match with Arsenal?") 1080b and 1800c. When a user response 1090 regarding the inquiry message is received, the artificial intelligent agent may match the user to a sub-group of users who frequently use words related to "Manchester United" and may not match the user to a sub-group of users who frequently use words related to "Arsenal" on the basis of the response.

Thereafter, the artificial intelligent agent may periodically monitor information related to "Manchester United".

As described above, when an event related to a group matched to the user occurs, the artificial intelligent agent according to the present disclosure may perform control related to the event. Accordingly, in the present disclosure, a user's interest may be automatically recognized from words of the user and information appropriate therefor may be automatically provided.

Meanwhile, when command information is received from the user, the artificial intelligent agent according to the present disclosure may determine whether to execute control corresponding to the command information according to vocabulary information corresponding to the user.

Figure 11:
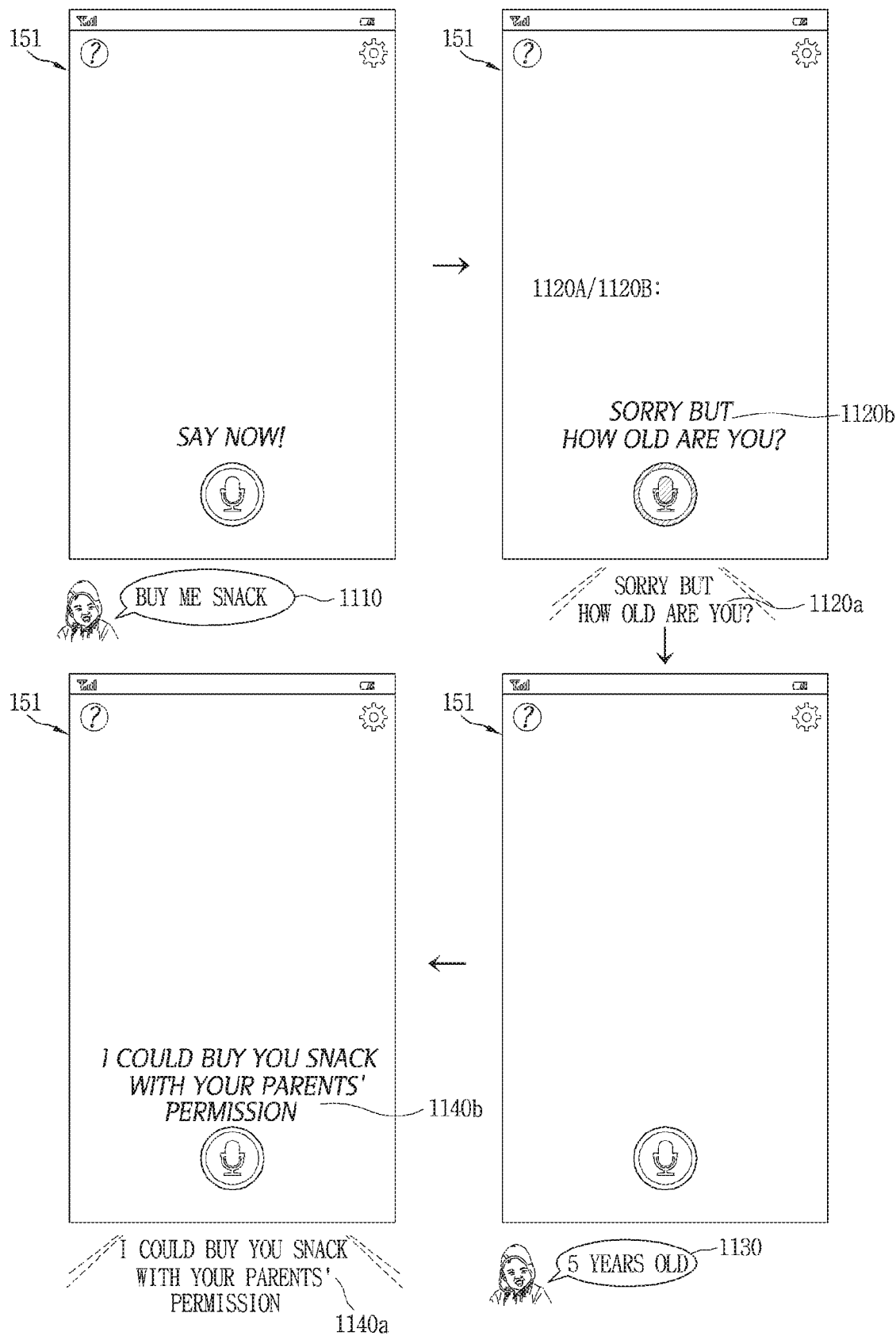
FIG. 11 is a conceptual view illustrating an embodiment in which an artificial intelligent agent determines whether to execute control corresponding to command information received from a user, according to extracted vocabulary information according to an embodiment of the present disclosure.

FIG. 11 is a conceptual view illustrating an embodiment in which an artificial intelligent agent determines whether to execute control corresponding to command information received from a user, according to extracted vocabulary information according to an embodiment of the present disclosure.

The artificial intelligent agent determines whether the user is qualified to apply the command information using vocabulary information extracted from the voice information. Here, qualification to apply the command information may be varied according to types of command information.

In detail, a specific function of the mobile terminal may be set to be executed only by a designated user. For example, a specific application may be set to be executed only by a main user of the mobile terminal, and a function to order certain goods may be allowed for users of a predetermined age or older.

The artificial intelligent agent may match the user who has applied voice information to a specific group using vocabulary information extracted from the voice information, and determines whether the matched group is a group qualified to apply specific command information.

For example, referring to FIG. 11, in case where command information 1110 to order a specific article is applied, the artificial intelligent agent determines whether the user who has applied the command information is a qualified user. It is assumed that ordering a specific article is allowed only for an age group of people of twenties or older. The artificial intelligent agent may match the user to an age group of ages of 1 to 5 through vocabulary information of the user. Since the group matched to the user is a group capable of applying the command information, the artificial intelligent agent may not perform control corresponding to the command information.

Meanwhile, in case where extracted vocabulary information satisfies a preset condition, the artificial intelligent agent may output a preset inquiry message and determine whether to perform control corresponding to the command information received from the user on the basis of a user input received in response to the inquiry message.

In case where the artificial intelligent agent determines that the user is not qualified to apply specific command information through extracted vocabulary information, the artificial intelligent agent may output a preset inquiry message to re-check the group matched to the user. Thereafter, the artificial intelligent agent re-specifies a group to which the user belongs through a received user input.

The artificial intelligent agent performs control corresponding to specific command information according to whether the user is qualified to apply the command information.

Referring to FIG. 11, for example, in case where the artificial intelligent agent determines that the user is not in the age group qualified to order specific goods, the artificial intelligent agent may output inquiry messages 1120a and 1120b inquiring about an age of the user. Thereafter, the artificial intelligent agent may receive a user's response 1130, and when it is determined that the user is not qualified to order the specific goods through the received response, the artificial intelligent agent may not order the specific goods. Here, the artificial intelligent agent may output messages 1140a and 1140b guiding that the specific goods cannot be ordered.

In this manner, in the present disclosure, an unqualified user is prevented from executing a specific function in the mobile terminal.

Meanwhile, the artificial intelligent agent according to the present disclosure may correct vocabularies of the user used during call communication.

Figure 12:
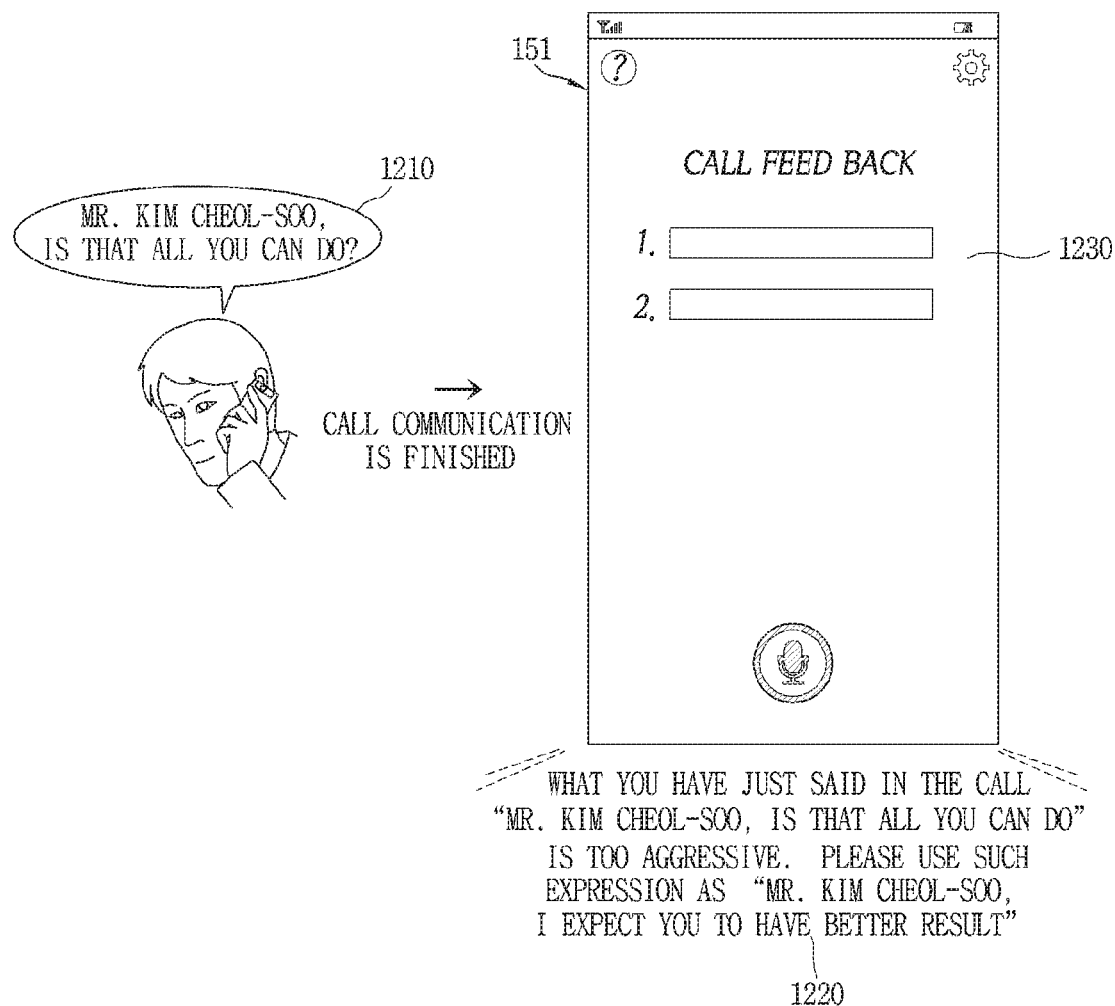
FIG. 12 is a conceptual view illustrating an embodiment in which an artificial intelligent agent corrects a user's vocabulary according to an embodiment of the present disclosure.

FIG. 12 is a conceptual view illustrating an embodiment in which an artificial intelligent agent corrects a user's vocabulary according to an embodiment of the present disclosure.

In detail, the artificial intelligent agent may extract vocabulary information from voice information of the user received during call communication, and after the call communication is finished, the artificial intelligent agent may output a feedback message regarding the call communication on the basis of the extracted vocabulary information.

The artificial intelligent agent determines whether the user has used a preset word, expression, and the like, during the call communication using the vocabulary information extracted during the call communication of the user. Here, the preset word or expression may be a word or expression which is too rude to be used for others or inappropriate for a current situation.

In case where an inappropriate expression is detected from vocabularies used by the user during the call communication, the artificial intelligent agent may output a feedback message after the call communication is finished. Here, the artificial intelligent agent may output a vocabulary which may replace the inappropriate vocabulary, as well as the fact that the specific vocabulary used by the user was inappropriate.

For example, referring to FIG. 12, when the user finishes the call communication, the artificial intelligent agent may output a feedback message regarding vocabularies used during the call communication. Here, in case where a plurality of vocabularies, among the vocabularies 1210 used during the call communication, are required to be corrected, the artificial intelligent agent may give priority to each of the plurality of vocabularies required to be corrected.

Here, priority may be given in order of low similarity with vocabulary information corresponding to a group matched to the user. That is, higher priority may be given to a vocabulary which is rarely used in a group to which the user belongs.

Thereafter, the artificial intelligent agent may output feedback regarding vocabularies with highest priority, as a voice message 1220, and may output feedback regarding the other remaining vocabularies through the touch screen.

In this manner, in the present disclosure, when the user makes an inappropriate expression during call communication, the inappropriate expression may be corrected.

Meanwhile, the artificial intelligent agent according to the present disclosure may visually display to which group the user is matched, upon receipt of a user request.

Figure 13:
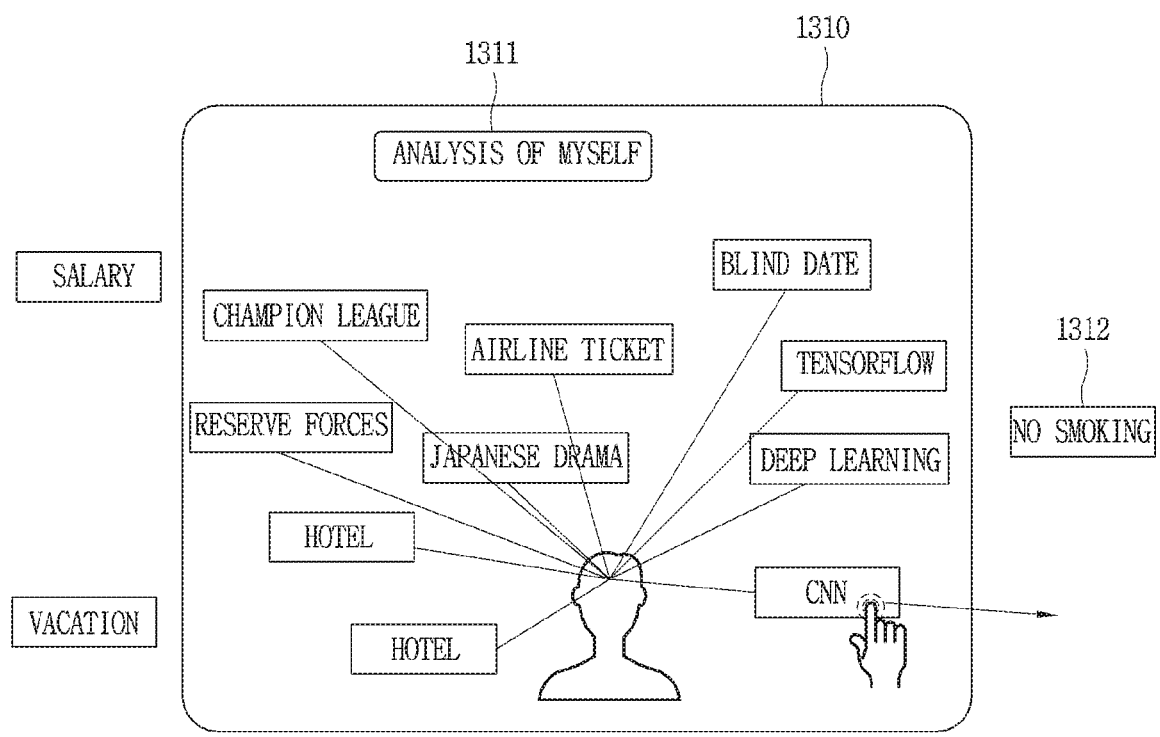
FIG. 13 is a conceptual view illustrating an embodiment in which an artificial intelligent agent visually displays a group matched to a user according to an embodiment of the present disclosure.

FIG. 13 is a conceptual view illustrating an embodiment in which an artificial intelligent agent visually displays a group matched to a user according to an embodiment of the present disclosure.

Referring to FIG. 13, the artificial intelligent agent may display at least one group to which a specific user is matched. Here, the at least one group may be displayed as a keyword representing each group, and the artificial intelligent agent may set a keyword representing each group using vocabulary information corresponding to each group.

In detail, the artificial intelligent agent may set any one of a word which is defined in vocabulary information corresponding to a specific group and which is most frequently used and a word of the uppermost concept, as a keyword representing the specific group. However, without being limited thereto, the keyword representing the specific group may be set in various manners.

Meanwhile, it may be set such that the user applies an input to the keywords so as not to be matched to a specific group or so as to be matched to a specific group. In detail, referring to FIG. 13, the artificial intelligent agent may display a group 1311 matched to the user in a first region 1310 and a group 1312 determined to be related to the user but not matched to the user in a second region.

Here, the group determined to be related to the user but not matched to the user may be selected from among groups previously formed according to at least one of a mobile terminal usage pattern of the user and a type of application installed in the mobile terminal.

The user may not match a specific group to the user by dragging the group matched to the user to the second region, and match a specific group to the user by dragging at least one of the groups displayed in the second region to the first region 1310.

Meanwhile, groups matched to the user may be continuously changed according to a voice input pattern of the user.

As described above, the artificial intelligent agent may visually display groups matched to the user. In this manner, in the present disclosure, a knowledge level, an interested field, language usage habit, and the like, of the user recognize through vocabularies of the user may be recognized at a glance.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a microphone;
a learning data unit configured to identify and store keywords; and
a controller configured to:
activate the microphone in response to an activation event;
receive a voice input via the microphone;
extract vocabulary information from the received voice input;
match a user associated with the received voice input to at least one group of a plurality of groups by comparing the extracted vocabulary information to the keywords where the keywords are associated with corresponding groups of the plurality of groups; and execute a control corresponding to command information included in the received voice input, wherein the executed control is varied for different groups of the plurality of groups, wherein when the user is matched to more than one group of the plurality of groups, the controller:

selects a user group with a highest relevance from the more than one group of the plurality of groups according to the extracted vocabulary information included in the voice input, wherein the selected user group is formed by a plurality of types including age, occupation, an educational level, gender, and a regional dialect; and outputs different response messages corresponding to the selected user group of the more than one matched group, wherein based on the selected user group being an expert group, a first response message is output in a language used by experts and based on the selected user group being a non-expert group, a second response message is output in a language used by non-experts.

2. The mobile terminal of claim 1, wherein:
the executed control comprises outputting a response message in response to the received voice input.

3. The mobile terminal of claim 2, wherein the outputted response message varies for different groups of the plurality of groups by using different vocabularies for the response message according to each group.

4. The mobile terminal of claim 1, wherein the controller is further configured to:

output an inquiry comprising information of a plurality of sub-groups of the matched at least one group; and select a sub user group of the plurality of sub-groups to be matched with the user based on a response input received in response to the output inquiry, wherein the selected group is selected based on a type of the control to be executed.

5. The mobile terminal of claim 4, wherein the controller further configured to, based on a determination that the received voice input by the user is in a specific regional dialect:

match the user to the expert group and the specific regional dialect group, and output the first response message in the language used by the experts and in the specific regional dialect.

6. The mobile terminal of claim 1, wherein the controller is further configured to execute an additional control when an event related to the matched at least one group is identified.

7. The mobile terminal of claim 6, wherein:
the executed additional control is related to one of the sub-groups of the plurality of sub-groups.

8. The mobile terminal of claim 1, wherein the controller is further configured to:

match the user to an age group through the extracted vocabulary information of the user;

determine whether the user who has applied the command information is a qualified user to order a specific product based on the matched age group; and control the order of the specific product corresponding to the command information not to perform when the user is determined not to be qualified.

9. The mobile terminal of claim 1, wherein the controller is further configured to:

output a preset inquiry message in response to the received voice input; and determine whether to execute the control based on another input received in response to the output preset inquiry message.

10. The mobile terminal of claim 1, wherein:
the received voice input is received during a call at the mobile terminal; and the executed control comprises outputting a feedback message regarding content of the call based on the extracted vocabulary information when the call is completed.

11. The mobile terminal of claim 10, wherein the activation event corresponds to initiating the call or accepting the call at the mobile terminal.

12. A method for controlling a mobile terminal, the method comprising:

receiving a voice input;

extracting vocabulary information from the received voice input;

matching a user associated with the received voice input to at least one group of a plurality of groups by comparing the extracted vocabulary information to the keywords where the keywords are associated with corresponding groups of the plurality of groups;

outputting an inquiry comprising information of a plurality of sub-groups of the matched at least one group;

selecting a sub-group of the plurality of sub-groups as a matched sub-group based on a response input received in response to the output inquiry message; and executing a control corresponding to command information included in the received voice input, wherein the executed control is varied for different groups of the plurality of groups, wherein when the user is matched to more than one group of the plurality of groups, matching the user to at least one group comprises:

selecting a user group with a highest relevance from the more than one group of the plurality of groups according to the extracted vocabulary information included in the voice input, wherein the selected user group is formed by a plurality of types including age, occupation, an educational level, gender, and a regional dialect; and outputting different response messages corresponding to the selected user group of the more than one matched group, wherein if the selected user group is an expert group, a first response message is output in a language used by experts and if the selected user group is a non-expert group, a second response message is output in a language used by non-experts.

13. The method of claim 12, wherein:
the executed control comprises outputting a response message in response to the received voice input.

14. The method of claim 12, wherein when the user is matched to more than one group of the plurality of groups, the method further comprises selecting a group based on a type of the control to be executed.

15. The method of claim 12, further comprising:
outputting a preset inquiry message in response to the received voice input; and determining whether to execute the control based on another input received in response to the output preset inquiry message.

16. The method of claim 12, wherein:
the received voice input is received during a call at the mobile terminal; and the executed control comprises outputting a feedback message regarding content of the call based on the extracted vocabulary information when the call is completed.

* * * * *